US012759214B2

(12) United States Patent
Zhang et al.

(10) Patent No.: US 12,759,214 B2
(45) Date of Patent: Oct. 13, 2026

(54) BIAXIALLY ORIENTED POROUS MEMBRANES, COMPOSITES, AND METHODS OF MANUFACTURE AND USE

(71) Applicant: Celgard, LLC, Charlotte, NC (US)

(72) Inventors: Xiaomin Zhang, Charlotte, NC (US); Gerald P. Rumierz, Fort Mill, SC (US); Karl F. Humiston, Tucson, AZ (US); Charles E. Haire, Lancaster, SC (US); Tyrone S. Fields, Charlotte, NC (US); Michael A. Braswell, Charlotte, NC (US); Ronald A. Proctor, Clover, SC (US)

(73) Assignee: Celgard, LLC, Charlotte, NC (US)

( * ) Notice: Subject to any disclaimer, the term of this patent is extended or adjusted under 35 U.S.C. 154(b) by 0 days.

(21) Appl. No.: 15/582,866

(22) Filed: May 1, 2017

(65) Prior Publication Data

US 2017/0266865 A1 Sep. 21, 2017

Related U.S. Application Data

(62) Division of application No. 13/044,708, filed on Mar. 10, 2011, now abandoned.

(Continued)

(51) Int. Cl.

*B29C 55/14* (2006.01)
*B01D 67/00* (2006.01)

(Continued)

(52) U.S. Cl.

CPC ........ *B29C 55/143* (2013.01); *B01D 67/0027* (2013.01); *B29C 55/16* (2013.01);

(Continued)

(58) Field of Classification Search

CPC ....... B29C 55/12; B29C 55/14; B29C 55/143; B29C 55/146; B29C 55/16;

(Continued)

(56) References Cited

U.S. PATENT DOCUMENTS

| | | | |
|---|---|---|---|
| 4,464,238 A | | 8/1984 | Caldwell et al. |
| 6,057,061 A | | 5/2000 | Callahan et al. |

(Continued)

FOREIGN PATENT DOCUMENTS

| | | | | |
|---|---|---|---|---|
| CN | 1887581 A | * | 1/2007 | ........... B29C 55/143 |
| CN | 101309952 A | | 11/2008 | |

(Continued)

OTHER PUBLICATIONS

Solomon B.A., Colton C.K., Friedman L.I., Castino F., Wiltbank T.B., Martin D.M. (1980) Microporous Membrane Filtration for Continuous-Flow Plasmapheresis. In: Cooper A.R. (eds) Ultrafiltration Membranes and Applications. Polymer Science and Technology, vol. 13. Springer, Boston, MA (Year: 1980).*

(Continued)

*Primary Examiner* — Christina H.W. Rosebach

(74) *Attorney, Agent, or Firm* — J. Clinton Wimbish; Maynard Nexsen PC

(57) ABSTRACT

At least a selected microporous membrane is made by a dry-stretch process and has substantially round shaped pores and a ratio of machine direction tensile strength to transverse direction tensile strength in the range of 0.5 to 6.0. The method of making the foregoing microporous membrane may include the steps of: extruding a polymer into a non-porous precursor, and biaxially stretching the nonporous precursor, the biaxial stretching including a machine direction stretching and a transverse direction stretching, the transverse direction including a simultaneous controlled machine direction relax. At least selected embodiments of (Continued)

the invention may be directed to biaxially oriented porous membranes, composites including biaxially oriented porous membranes, biaxially oriented microporous membranes, biaxially oriented macroporous membranes, battery separators, filtration media, humidity control media, flat sheet membranes, liquid retention media, and the like, related methods, methods of manufacture, methods of use, and the like.

15 Claims, 19 Drawing Sheets

Related U.S. Application Data

(60) Provisional application No. 61/313,152, filed on Mar. 12, 2010.

(51) Int. Cl.

| | |
|---|---|
| ***B29C 55/16*** | (2006.01) |
| ***C08G 69/00*** | (2006.01) |
| ***H01M 10/0565*** | (2010.01) |
| ***H01M 50/406*** | (2021.01) |
| ***H01M 50/417*** | (2021.01) |
| ***H01M 50/454*** | (2021.01) |
| ***H01M 50/491*** | (2021.01) |
| ***H01M 50/494*** | (2021.01) |
| ***H01M 50/581*** | (2021.01) |
| *B29L 31/00* | (2006.01) |
| *H01M 10/0525* | (2010.01) |

(52) U.S. Cl.

CPC ........ *C08G 69/00* (2013.01); *H01M 10/0565* (2013.01); *H01M 50/406* (2021.01); *H01M 50/417* (2021.01); *H01M 50/454* (2021.01); *H01M 50/491* (2021.01); *H01M 50/494* (2021.01); *H01M 50/581* (2021.01); *B01D 2325/021* (2013.01); *B01D 2325/0283* (2022.08); *B29L 2031/755* (2013.01); *H01M 10/0525* (2013.01); *Y10T 428/249978* (2015.04); *Y10T 442/3854* (2015.04); *Y10T 442/40* (2015.04); *Y10T 442/674* (2015.04)

(58) Field of Classification Search

CPC .......... B01D 67/0027; B01D 2325/021; B01D 36/003–008; B01D 2257/80; B01D 2325/02; C08G 69/00; H01M 2/145; H01M 50/403; H01M 10/0565; H01M 50/454; H01M 50/406; H01M 10/0525; H01M 50/494; H01M 50/491; H01M 50/581; H01M 50/417; B29L 2031/755; F25B 43/003; Y10T 442/40; Y10T 442/3854; Y10T 442/674

See application file for complete search history.

(56) References Cited

U.S. PATENT DOCUMENTS

| | | | | |
|---|---|---|---|---|
| 6,080,507 | A | 6/2000 | Yu | |
| 6,602,593 | B1 * | 8/2003 | Callahan | H01M 50/451 428/315.9 |
| 6,811,643 | B2 | 11/2004 | McAmish et al. | |
| 2003/0213549 | A1 * | 11/2003 | McAmish | B29C 55/146 156/229 |
| 2006/0272499 | A1 * | 12/2006 | Miller | B01D 53/228 95/45 |
| 2007/0196638 | A1 * | 8/2007 | Wei | B01D 67/0027 428/304.4 |
| 2007/0238017 | A1 | 10/2007 | Call et al. | |
| 2008/0118827 | A1 | 5/2008 | Call et al. | |
| 2008/0299380 | A1 | 12/2008 | Choi et al. | |
| 2010/0313753 | A1 * | 12/2010 | Calis | B01D 39/2082 96/12 |
| 2011/0223486 | A1 | 9/2011 | Zhang et al. | |
| 2013/0168817 | A1 | 7/2013 | Kawahara et al. | |

FOREIGN PATENT DOCUMENTS

| | | | | |
|---|---|---|---|---|
| CN | 101724168 | A | 6/2010 | |
| EP | 01081775 | A2 | 3/2001 | |
| JP | 2000-312802 | A | 11/2000 | |
| JP | 2005-518290 | A | 6/2005 | |
| JP | 2006-028495 | A | 2/2006 | |
| JP | 2007-262203 | A | 10/2007 | |
| JP | 2007-311332 | A | 11/2007 | |
| JP | 2007-321116 | A | 12/2007 | |
| JP | 2009-527633 | A | 7/2009 | |
| JP | 2010-510627 | A | 4/2010 | |
| JP | 2013-098519 | A | 5/2013 | |
| JP | 2013-527260 | A | 6/2013 | |
| JP | 2016-166334 | A | 9/2016 | |
| KR | 10-2008-0085922 | A | 9/2008 | |
| WO | WO-9108724 | A1 * | 6/1991 | A61L 26/0014 |
| WO | WO 02/051938 | A2 | 7/2002 | |
| WO | WO 2007/098339 | | 8/2007 | |
| WO | WO-2009103556 | A1 * | 8/2009 | B01D 39/2017 |
| WO | 2011/057587 | A1 | 5/2011 | |

OTHER PUBLICATIONS

Gösele, W. and Alt, C. (2000). Filtration. In Ullmann's Encyclopedia of Industrial Chemistry, (Ed.). doi:10.1002/14356007.b02_10 (Year: 2000).*

Bas, Ed. (2004). Indoor Air Quality—A Guide for Facility Managers (2nd Edition)—5.1 Introduction. River Publishers. Retrieved from https://app.knovel.com/hotlink/pdf/id:kt010QMX93/indoor-air-quality-guide/improving--introduction (Year: 2004).*

P. Jacoby. "Beta nucleating masterbatch offers enhanced properties in polypropylene products". Plastics, Additives and Compounding. vol. 9, Issue 3, May-Jun. 2007, pp. 32-35 (Year: 2007).*

Translation of CN1887581 by Luo et al. (Year: 2007).*

Faulkner, D. Performance and cost of particle air filtration technologies. Indoor Air, 12(4). Permalink: https://escholarship.org/uc/item/61z8380k. (Year: 2005).*

Robert E. Kesting, "Synthetic Polymeric Membranes, A Structural Perspective," 2nd ed., John Wiley & Sons (New York City, NY), (p. 237-286 & 290-297), (1985).

Equistar. "Factors Affecting the Permeability of PE Blown Films" by Equistar, p. 6, "Conclusions". (1997).

Korean Divisional office action received May 30, 2021; from counterpart Korean Application No. 10-2021-7001682.

Office Action received for Japanese Patent Application No. 2024-033889, mailed on Jan. 21, 2025, 14 pages including English translation.

Decision of refusal received for Japanese Patent Application No. 2024-033889, mailed on May 27, 2025, 06 pages including English translation.

Office Action received for Japanese Patent Application No. 2017-225491, mailed on Jan. 8, 2019, 06 pages including English translation.

Search report received for Japanese Patent Application No. 2017-225491, mailed on Nov. 5, 2018, 18 pages including English translation.

Decision to Grant received for Japanese Patent Application No. 2017-225491, mailed on Sep. 1, 2020, 05 pages including English translation.

Office Action received for Japanese Patent Application No. 2017-225491, mailed on Oct. 1, 2019, 04 pages including English translation.

Office action received for European Patent Application No. 11754128.4, mailed on Nov. 22, 2016, 05 pages.

Extended European Search Report received for European Patent Application No. 11754128.4, mailed on Jul. 31, 2015, 05 pages.

(56) References Cited

OTHER PUBLICATIONS

Office action received for European Patent Application No. 11754128.4, mailed on Jul. 1, 2016, 03 pages.
Decision of refusal received for Japanese Patent Application No. 2016-022936, mailed on Aug. 1, 2017, 06 pages including English translation.
Office Action received for Japanese Patent Application No. 2016-022936, mailed on Apr. 4, 2017, 12 pages including English translation.
Decision of refusal received for Japanese Patent Application No. 2012-557266, mailed on Oct. 20, 2015, 04 pages including English translation.
Office Action received for Japanese Patent Application No. 2012-557266, mailed on Dec. 9, 2014, 08 pages including English translation.
Search report received for Japanese Patent Application No. 2012-557266, mailed on Nov. 28, 2014, 13 pages including English translation.
Decision of refusal received for Japanese Patent Application No. 2022-191517, mailed on Nov. 7, 2023, 06 pages including English translation.
Office Action received for Japanese Patent Application No. 2022-191517, mailed on May 23, 2023, 14 pages including English translation.
Office Action received for Korean Patent Application No. 10-2012-7023376, mailed on Feb. 22, 2017, 13 pages including English translation.
Final Office Action received for Korean Patent Application No. 10-2012-7023376, mailed on Aug. 30, 2017, 05 pages including English translation.
Decision of refusal received for Japanese Patent Application No. 2020-166927, mailed on Aug. 9, 2022, 09 pages including English translation.
Office Action received for Japanese Patent Application No. 2020-166927, mailed on Nov. 22, 2021, 10 pages including English translation.
International Search Report and Written Opinion received for International Patent Application No. PCT/US2011/028019, mailed on May 10, 2011, 07 pages.
International preliminary report on patentability Chapter II received for International Patent Application No. PCT/US2011/028019, mailed on Aug. 24, 2012, 27 pages.
Office action received for Chinese Patent Application No. 201180023187.1, mailed on Apr. 10, 2015, 08 pages including English translation.
Office action received for Chinese Patent Application No. 201180023187.1, mailed on Jun. 3, 2014, 13 pages including English translation.
Office action received for Chinese Patent Application No. 201180023187.1, mailed on Aug. 17, 2016, 12 pages including English translation.
Office action received for Chinese Patent Application No. 201180023187.1, mailed on Dec. 9, 2015, 10 pages including English translation.
Office action received for Chinese Patent Application No. 201180023187.1, mailed on Jan. 23, 2017, 07 pages including English translation.
Office Action received for Korean Patent Application No. 10-2022-7007744, mailed on Jun. 19, 2023, 07 pages including English translation.
Office Action received for Korean Patent Application No. 10-2022-7007744, mailed on Dec. 26, 2022, 20 pages including English translation.
Office Action received for Korean Patent Application No. 10-2022-7007744, mailed on Jun. 27, 2022, 06 pages including English translation.
Written Decision on Registration received for Korean Patent Application No. 10-2022-7007744, mailed on Nov. 3, 2023, 06 pages including English translation.
Office Action received for Korean Patent Application No. 10-20177-025941, mailed on Dec. 6, 2017, 11 pages including English translation.
Written Decision on Registration received for Korean Patent Application No. 10-20177-025941, mailed on Jun. 19, 2018, 04 pages including English translation.
Office Action received for Korean Patent Application No. 10-2018-7026494, mailed on Dec. 6, 2018, 05 pages including English translation.
Office Action received for Korean Patent Application No. 10-2018-7026494, mailed on Dec. 14, 2018, 05 pages including English translation.
Written Decision on Registration received for Korean Patent Application No. 10-2018-7026494, mailed on Oct. 19, 2020, 04 pages including English translation.
Search Report received for Chinese Patent Application No. 201710665948.2, mailed on Nov. 2, 2020, 01 page.
Search Report received for Chinese Patent Application No. 201710665948.2, mailed on Nov. 18, 2019, 01 page.
Search Report received for Chinese Patent Application No. 201710665948.2, mailed on Apr. 25, 2021, 01 page.
Search Report received for Chinese Patent Application No. 201710665948.2, mailed on Apr. 20, 2020, 01 page.
Written Decision on Registration received for Korean Patent Application No. 10-2021-7001682, mailed on Dec. 9, 2021, 04 pages including English translation.
Office Action received for Korean Patent Application No. 10-2021-7001682, mailed on Apr. 13, 2021, 16 pages including English translation.
Office Action received for Korean Patent Application No. 10-2024-7002330, mailed on Feb. 7, 2025, 09 pages including English translation.
Office Action received for Korean Patent Application No. 10-2024-7002330, mailed on Jun. 17, 2024, 08 pages including English translation.
Written Decision on Registration received for Korean Patent Application No. 10-2024-7002330, mailed on Oct. 20, 2025, 06 pages including English translation.

* cited by examiner

Dry-Stretch Monolayer Polypropylene (PP)

Wet Process Monolayer Polyethylene (PE)

Surface view SEM

Cross sectional view SEM

2500 Morphology

Surface

Surface

2500 Morphology

Cross Section

Morphology
Sample B

Surface SEM Morphology:
Pore Size: 0.3-0.6 um
Average Aspect Ration ~ 1.0

Surface A

Surface B

Cross Section

Morphology of Laminated with non-woven
Sample C

Surface
SEM Morphology:

Pore Size:
0.3-0.6 um

Average Aspect
Ratio: ~ 1.0

Surface A

Morphology of Laminated with non-woven

Sample C

Surface B

Morphology of Laminated with non-woven
Sample C

Cross Section

Morphology
Sample A

Surface SEM Morphology:

Pore Size: 0.3-0.7 um

Average Aspect Ratio: ~ 1.0

Surface A

Surface B

Laminated with non-woven
Sample G

Surface
SEM Morphology:

Pore Size:
0.3-0.6 um

Average Aspect
Ratio: ~ 1.0-1.10

Surface A

Laminated with non-woven
Sample G

Surface B

Sample G
Laminated with non-woven
Cross Section
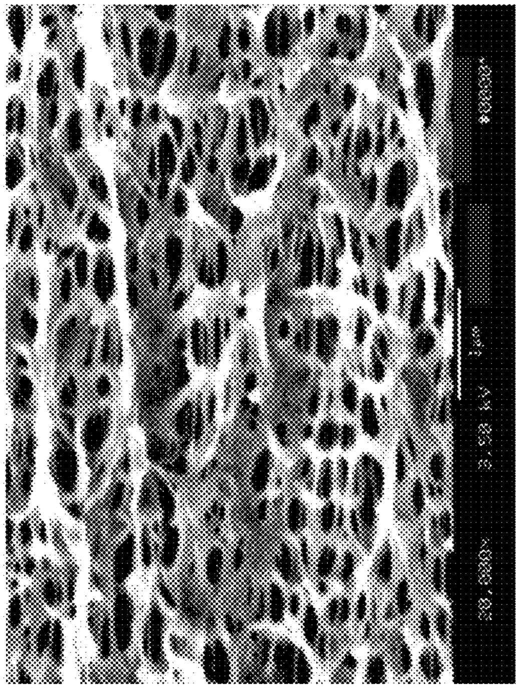
Fig. 38
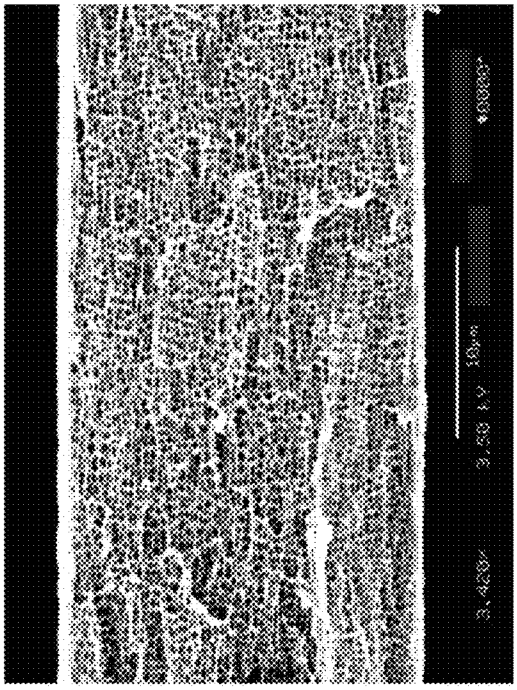
Fig. 39
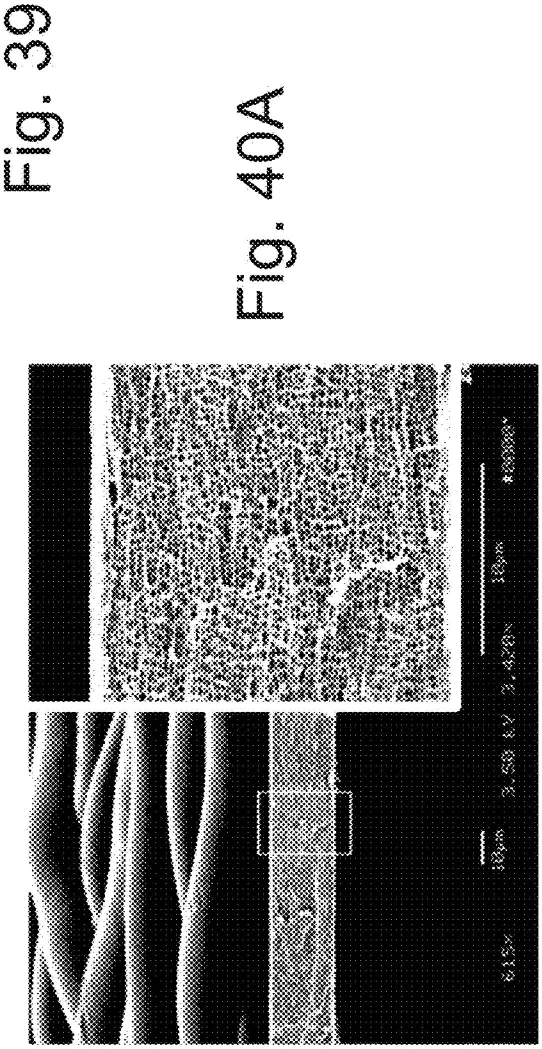
Fig. 40
Fig. 40A Morphology
Sample E Surface SEM
Morphology:

Pore Size:
0.4-0.9 um

Average Aspect
Ratio: ~1.0

Surface A

Surface B

Cross Section

Morphology
Sample F

Surface SEM Morphology:

Pore Size: 0.4-1.0 um

Average Aspect Ratio: ~ 1.10

Surface A

Surface B

Coex Morphology:
Sample D

Surface A

Surface B

BIAXIALLY ORIENTED POROUS MEMBRANES, COMPOSITES, AND METHODS OF MANUFACTURE AND USE

CROSS-REFERENCE TO RELATED APPLICATIONS

This application is a divisional application of and claims the benefit of and priority to co-pending U.S. application Ser. No. 13/044,708 filed Mar. 10, 2011, which is now abandoned, and which co-pending application claims the benefit of and priority to U.S. Provisional Patent Application Ser. No. 61/313,152 filed Mar. 12, 2010, both of which are incorporated herein by reference.

FIELD OF THE INVENTION

The invention is directed to biaxially oriented porous membranes, composites including biaxially oriented porous membranes, biaxially oriented microporous membranes, biaxially oriented macroporous membranes, battery separators, filtration media, humidity control media, flat sheet membranes, liquid retention media, and the like, related methods, methods of manufacture, methods of use, and the like.

BACKGROUND OF THE INVENTION

Microporous polymer membranes are known, can be made by various processes, and the process by which the membrane is made may have a material impact upon the membrane's physical attributes. See, for example, Kesting, Robert E., *Synthetic Polymeric Membranes, A Structural Perspective*, Second Edition, John Wiley & Sons, New York, NY, (1985). Three different known processes for making microporous polymer membranes include: the dry-stretch process (also known as the CELGARD process), the wet process, and the particle stretch process.

The dry-stretch process (the CELGARD process) refers to a process where pore formation results from stretching a nonporous, semicrystalline, extruded polymer precursor in the machine direction (MD stretch). See, for example, Kesting, Ibid. pages 290-297, incorporated herein by reference. Such a dry-stretch process is different from the wet process and the particle stretch process. Generally, in the wet process, also known as the phase inversion process, the extraction process, or the TIPS process, the polymeric raw material is mixed with a processing oil (sometimes referred to as a plasticizer), this mixture is extruded, and pores are then formed when the processing oil is removed (these films may be stretched before or after the removal of the oil). See, for example, Kesting, Ibid. pages 237-286, incorporated herein by reference.

Generally, in the particle stretch process, the polymeric raw material is mixed with particulate, this mixture is extruded, and pores are formed during stretching when the interfaces between the polymer and the particulate fracture due to the stretching forces. See, for example, U.S. Pat. Nos. 6,057,061 and 6,080,507, incorporated herein by reference.

Moreover, the membranes arising from these different formation processes are usually physically different and the process by which each is made typically distinguishes one membrane from the other. For example, dry-stretch process membranes may have slit shaped pores due to the stretching of the precursor in the machine direction (the MD)(for example, see FIGS. 1-3). Wet process membranes tend to have rounder pores and a lacelike appearance due to the oil or plasticizer and the stretching of the precursor in the machine direction (MD) and in the transverse machine direction or transverse direction (the TD)(for example, see FIG. 4). Particle stretch process membranes, on the other hand, may have oval shaped pores as the particulate and machine direction stretching (MD stretch) tend to form the pores (for example, see FIG. 5A). Accordingly, each membrane may be distinguished from the other by its method of manufacture.

While membranes made by the dry-stretch process have met with excellent commercial success, such as a variety of CELGARD® dry-stretch porous membranes sold by Celgard, LLC of Charlotte, North Carolina, including flat sheet membranes, battery separators, hollow fibers, and the like, there is a need to improve, modify or enhance at least selected physical attributes thereof, so that they may be used in a wider spectrum of applications, may perform better for particular purposes, or the like.

The use of air-filters to remove or reduce airborne contaminants such as dust, dust mites, molds, bacteria, dog dander, odors, and gases is generally known. Conventionally, air-filters include a filter medium formed from a bat, mat or sheet of porous material that is pleated and placed in a rectangular frame or support or folded into a corrugated oval or cylinder to provide a large filtration area in a relatively small volume.

While at least certain air filters have met with commercial success, there is a need for improved filtration media or filters so that they may be used in a wider spectrum of filtration or separation applications, may perform better for particular purposes, or the like.

The use of porous materials for the selective passage of gases and blockage of liquids is known. For example, LIQUI-CEL® hollow fiber membrane contactors, sold by Membrana-Charlotte a division of Celgard, LLC of Charlotte, North Carolina, are used for degassing or debubbling liquids. More particularly, LIQUI-CEL® membrane contactors are used extensively for deaeration of liquids in the microelectronics, pharmaceutical, power, food, beverage, industrial, photographic, ink, and analytical markets around the world.

The use of porous materials for filtration or separation processes is known. For example, various flat sheet membranes marketed or sold by Membrana GmbH of Wuppertal, Germany, or by Celgard, LLC and Daramic, LLC both of Charlotte, North Carolina, are used for filtration or separation processes. More particularly, such flat sheet membranes have been used to separate solid particles and liquids, gases from liquids, particles from gases, and the like.

While certain such porous materials for filtration or separation processes have met with commercial success, there is a need for improved porous materials so that they may be used in a wider spectrum of applications, may perform better for particular purposes, or the like.

The use of porous materials for the selective passage of humidity (moisture vapor) and blockage of liquid water, liquid desiccant, or other aqueous solutions may be known. In such liquid-desiccant systems, temperature and humidity may be controlled by a salt solution (or desiccant) which absorbs or emits water vapor.

The use of porous materials for the selective passage of water vapor (heat and moisture) and the blockage of gasses (exhaust and intake gases) may be known in connection with energy recovery ventilation (ERV) wherein heat and humidity are exchanged between make-up and exhaust air in a ventilation system.

The use of porous materials for the selective passage of pure or fresh water and blockage of salt or salt water is also known in connection with reverse osmosis desalination wherein a porous material, such as a reverse osmosis filter (RO filter) which allows pure water (fresh water) to pass there through but which restrains salt. With the salt water at a high pressure, fresh water is forced through the porous material and forms the fresh water stream.

The use of porous materials for the selective passage of water vapor or humidity (moisture vapor) and blockage of liquid salt water may also be known in connection with steam desalination wherein a porous material, such as a high charge density membrane may hold back salt water but pass salt-free water vapor to separate salt water and fresh water. With the salt water at a high temperature, fresh water vapor emits from the salt water, may migrate through the porous material, and condense to form a fresh water stream.

The use of porous materials for the selective passage of gases or humidity (moisture vapor) and blockage of liquids such as water may be known in connection with fuel cells such as hydrogen fuel cells having a proton exchange membrane (PEM) that must stay continually humidified. Waste water in the form of humid vapor may pass through a porous material and may be collected in a waste water holding compartment or discharged.

While possibly certain such porous materials for the selective passage of gases or humidity (moisture vapor) and blockage of liquid water or salt water may have met with commercial success, such as RO membranes sold by Dow Chemical, or expanded polytetrafluoroethylene (ePTFE) membranes sold by W.L. Gore, BHA, and others, there is a need for improved porous materials so that they may be used in a wider spectrum of applications, may perform better for particular purposes, or the like.

SUMMARY OF THE INVENTION

In accordance with at least selected porous material, film, layer, membrane, laminate, coextrusion, or composite embodiments of the present invention, some areas of improvement may include pore shapes other than slits, round shaped pores, increased transverse direction tensile strength, a balance of MD and TD physical properties, high performance related to, for example, moisture transport and hydrohead pressure, reduced Gurley, high porosity with balanced physical properties, uniformity of pore structure including pore size and pore size distribution, enhanced durability, composites of such membranes with other porous materials, composites or laminates of such membranes, films or layers with porous nonwovens, coated membranes, coextruded membranes, laminated membranes, membranes having desired moisture transport (or moisture vapor transport), hydrohead performance, and physical strength properties, usefulness in more physically abusive environments without loss of desirable membrane features, combination of membrane moisture transport performance combined with the macro physical properties, being hydrophobic, highly permeable, chemically and mechanically stable, having high tensile strength, combinations thereof, and/or the like.

While certain membranes made by the dry-stretch process have met with excellent commercial success, there is a need to improve, modify or enhance at least selected physical attributes thereof, so that they may be used in a wider spectrum of applications, perform better for particular purposes, and/or the like. In accordance with at least selected embodiments of dry-stretch process membranes of the present invention, some areas of improvement may include pore shapes other than slits, round shaped pores, increased transverse direction tensile strength, a balance of MD and TD physical properties, uniformity of pore structure including pore size and pore size distribution, high performance related to, for example, moisture transport (or moisture vapor transport) and hydrohead pressure, reduced Gurley, high porosity with balanced physical properties, enhanced durability, composites of such membranes with other porous materials, composites or laminates of such membranes with porous nonwovens, coated membranes, coextruded membranes, laminated membranes, membranes having desired moisture transport, hydrohead performance, and physical strength properties, useful in more physically abusive environments without loss of desirable membrane features, combination of the membrane moisture transport performance combined with the macro physical properties, combinations thereof, and/or the like.

In accordance with at least selected possibly preferred embodiments, the porous membrane of the present invention is possibly preferably a dry-stretch process, porous membrane, film, layer, or composite that is hydrophobic, highly permeable, chemically and mechanically stable, has high tensile strength, and combinations thereof. These properties appear to make it an ideal membrane or film for the following applications, each of which (with the exception of air filtration) may involve the selective passage of moisture vapor (or other gases) and blockage of liquid water (or other liquids):

1. HVAC:
   a. Liquid-desiccant (LD) air conditioning (temperature and humidity control): In a membrane-based LD system, temperature and humidity may be controlled by a salt solution which absorbs or emits water vapor through a porous membrane. Heat is the motive force in the system (not pressure, as in most air conditioning systems). To make the system work, it may be necessary to have a hydrophobic membrane (to hold back the liquid) that readily passes water vapor.
   b. Water-based air conditioning (temperature and humidity control): Evaporative cooling systems or cooling water systems operate on a somewhat different principle than the LD systems, but would use the same essential properties of the membrane.
   c. Energy recovery ventilation (ERV): The simplest HVAC application uses the membrane as a key component of a heat and humidity exchange between make-up and exhaust air.
2. Desalination: Steam desalination applications use the same membrane properties as HVAC. Because the membrane holds back liquid salt water but passes water vapor, a system can be constructed which has salt water and fresh water separated by a membrane. With the salt water at a higher temperature, fresh water vapor emits from the salt water, migrates through the membrane, and condenses to form the fresh water stream.
3. Fuel cells: In a fuel cell, the proton exchange membrane (PEM) must stay continually humidified. This can be accomplished with the use of a membrane-based humidification unit.
4. Liquid and/or air filtration: In these embodiments, the porous membrane may act as a simple filter. As the liquid, vapor, gas, or air passes through the membrane, particles that are too large to pass through the pores are blocked at the membrane surface.

Particularly in the cases of liquid and air filtration, the unique pore structure of at least selected embodiments of the present invention may provide embodiments, materials or membranes that have certain specific benefits, such as the benefits of durability, high efficiency, narrow pore size distribution, and uniform flow rate.

In accordance with at least selected porous material or porous membrane embodiments of the present invention, at least a selected porous mono-layer polypropylene (monolayer PP) membrane has excellent balance of MD and TD physical properties while also being a high performance membrane as measured by the moisture transport and hydrohead performance. This selected monolayer PP membrane may also have high porosity (>60%) but still maintain the balanced physical properties when compared to more traditional membranes. Also, this selected monolayer PP membrane or film can be produced in union with or laminated to a porous polypropylene (PP) nonwoven material (nonwoven PP) on one or both sides thereof. The resultant composite, membrane or product (monolayer PP/nonwoven PP) or (nonwoven PP/monolayer PP/nonwoven PP) may preferably retain the excellent moisture transport and even more improved hydrohead performance. Also, this resultant composite product (monolayer PP/nonwoven PP) or (nonwoven PP/monolayer PP/nonwoven PP) may have physical strength properties that far exceed comparative membranes. Therefore, this new resultant composite product (monolayer PP/nonwoven PP) or (nonwoven PP/monolayer PP/nonwoven PP) may have the added advantage of being useful in more physically abusive environments without a loss of the highly desirable membrane features. It is believed that these selected monolayer PP membrane and composite products (monolayer PP; monolayer PP/nonwoven PP; or, nonwoven PP/monolayer PP/nonwoven PP) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, hydrohead pressure, strength, and the like.

In accordance with at least selected porous material or porous membrane embodiments of the present invention, at least a selected porous multi-layer polypropylene (multilayer PP) membrane has excellent balance of MD and TD physical properties while also being a high performance membrane as measured by the moisture transport and hydrohead performance. This selected multilayer PP membrane may also have high porosity (>60%) but still maintain the balanced physical properties when compared to more traditional membranes. Also, this selected multilayer PP membrane or film can be produced in union with or laminated to a porous polypropylene (PP) nonwoven material (nonwoven PP) on one or both sides thereof. The resultant composite, membrane or product (multilayer PP/nonwoven PP) or (nonwoven PP/multilayer PP/nonwoven PP) may preferably retain the excellent moisture transport and even more improved hydrohead performance. Also, this resultant composite product (multilayer PP/nonwoven PP) or (nonwoven PP/multilayer PP/nonwoven PP) may have physical strength properties that far exceed comparative membranes. Therefore, this new resultant composite product (multilayer PP/nonwoven PP) or (nonwoven PP/multilayer PP/nonwoven PP) may have the added advantage of being useful in more physically abusive environments without a loss of the highly desirable membrane features. It is believed that these selected multilayer PP membrane and composite products (multilayer PP; multilayer PP/nonwoven PP; or, nonwoven PP/multilayer PP/nonwoven PP) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, hydrohead pressure, strength, and the like.

In accordance with at least selected porous material or porous membrane embodiments of the present invention, at least a selected porous mono-layer polyethylene (monolayer PE) membrane has excellent balance of MD and TD physical properties while also being a high performance membrane as measured by the moisture transport and hydrohead performance. This selected monolayer PE membrane may also have high porosity (>60%) but still maintain the balanced physical properties when compared to more traditional membranes. Also, this selected monolayer PE membrane or film can be produced in union with or laminated to a porous polyethylene (PE) nonwoven material (nonwoven PE) or porous polypropylene (PP) nonwoven material (nonwoven PP) on one or both sides thereof. The resultant composite, membrane or product (monolayer PE/nonwoven PE) or (nonwoven PE/monolayer PE/nonwoven PE) may preferably retain the excellent moisture transport and even more improved hydrohead performance. Also, this resultant composite product (monolayer PE/nonwoven PE) or (nonwoven PE/monolayer PE/nonwoven PE) may have physical strength properties that far exceed comparative membranes. Therefore, this new resultant composite product (monolayer PE/nonwoven PE) or (nonwoven PE/monolayer PE/nonwoven PE) may have the added advantage of being useful in more physically abusive environments without a loss of the highly desirable membrane features. It is believed that these selected monolayer PE membrane and composite products (monolayer PE; monolayer PE/nonwoven PE; or, nonwoven PE/monolayer PE/nonwoven PE) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, hydrohead pressure, strength, and the like.

In accordance with at least selected porous material or porous membrane embodiments of the present invention, at least a selected porous multi-layer polyethylene (multilayer PE) membrane has excellent balance of MD and TD physical properties while also being a high performance membrane as measured by the moisture transport and hydrohead performance. This selected multilayer PE membrane may also have high porosity (>60%) but still maintain the balanced physical properties when compared to more traditional membranes. Also, this selected multilayer PE membrane or film can be produced in union with or laminated to a porous polyethylene (PE) nonwoven material (nonwoven PE) or porous polypropylene (PP) nonwoven material (nonwoven PP) on one or both sides thereof. The resultant composite, membrane or product (multilayer PE/nonwoven PE) or (nonwoven PE/multilayer PE/nonwoven PE) may preferably retain the excellent moisture transport and even more improved hydrohead performance. Also, this resultant composite product (multilayer PE/nonwoven PE) or (nonwoven PE/multilayer PE/nonwoven PE) may have physical strength properties that far exceed comparative membranes. Therefore, this new resultant composite product (multilayer PE/nonwoven PE) or (nonwoven PE/multilayer PE/nonwoven PE) may have the added advantage of being useful in more physically abusive environments without a loss of the highly desirable membrane features. It is believed that these selected multilayer PE membrane and composite products (multilayer PE; multilayer PE/nonwoven PE; or, nonwoven PE/multilayer PE/nonwoven PE) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, hydrohead pressure, strength, and the like.

In accordance with at least selected porous material or porous membrane embodiments of the present invention, at least a selected porous monolayer polymer membrane, for example, a monolayer (may have one or more plies) polyolefin (PO) membrane, such as a polypropylene (PP) and/or polyethylene (PE) (including PE, PP, or PE+PP blends) monolayer membrane, has excellent balance of MD and TD physical properties while also being a high performance membrane as measured by the moisture transport (or moisture vapor transport) and hydrohead performance. This selected monolayer PO membrane may also have high porosity (>60%) but still maintain the balanced physical properties when compared to more traditional membranes. Also, this selected monolayer PO membrane or film can be produced in union with or laminated to a porous nonwoven material, such as a nonwoven polymer material, for example, a PO nonwoven material (such as a porous polyethylene (PE) nonwoven material (nonwoven PE) and/or porous polypropylene (PP) nonwoven material (nonwoven PP) (including PE, PP, or PE+PP blends)) on one or both sides thereof. The resultant composite, membrane or product (monolayer PO/nonwoven PO) or (nonwoven PO/monolayer PO/nonwoven PO) may preferably retain the excellent moisture transport (or moisture vapor transport) and even more improved hydrohead performance. Also, this resultant composite product (monolayer PO/nonwoven PO) or (nonwoven PO/monolayer PO/nonwoven PO) may have physical strength properties that far exceed comparative membranes. Therefore, this new resultant composite product (monolayer PO/nonwoven PO) or (nonwoven PO/monolayer PO/nonwoven PO) may have the added advantage of being useful in more physically abusive environments without a loss of the highly desirable membrane features. It is believed that these selected monolayer PO membrane and composite products (monolayer PO; monolayer PO/nonwoven PO; or, nonwoven PO/monolayer PO/nonwoven PO) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, moisture vapor transport, hydrohead pressure, strength, and the like.

In accordance with at least selected porous material or porous membrane embodiments of the present invention, at least a selected porous multi-layer polymer membrane, for example, a multi-layer (two or more layer) polyolefin (PO) membrane, such as a polypropylene (PP) and/or polyethylene (PE) (including PE, PP, or PE+PP blends) multilayer membrane, has excellent balance of MD and TD physical properties while also being a high performance membrane as measured by the moisture transport (or moisture vapor transport) and hydrohead performance. This selected multilayer PO membrane may also have high porosity (>60%) but still maintain the balanced physical properties when compared to more traditional membranes. Also, this selected multilayer PO membrane or film can be produced in union with or laminated to a porous PO nonwoven material (such as a porous polyethylene (PE) nonwoven material (nonwoven PE) and/or porous polypropylene (PP) nonwoven material (nonwoven PP)) on one or both sides thereof. The resultant composite, membrane or product (multilayer PO/nonwoven PO) or (nonwoven PO/multilayer PO/nonwoven PO) may preferably retain the excellent moisture transport and even more improved hydrohead performance. Also, this resultant composite product (multilayer PO/nonwoven PO) or (nonwoven PO/multilayer PO/nonwoven PO) may have physical strength properties that far exceed comparative membranes. Therefore, this new resultant composite product (multilayer PO/nonwoven PO) or (nonwoven PO/multilayer PO/nonwoven PO) may have the added advantage of being useful in more physically abusive environments without a loss of the highly desirable membrane features. It is believed that these selected multilayer PO membrane and composite products (multilayer PO; multilayer PO/nonwoven PO; or, nonwoven PO/multilayer PO/nonwoven PO) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, hydrohead pressure, strength, and the like.

In accordance with at least selected porous material or porous membrane embodiments of the present invention, the pores (openings) have the following pore aspect ratios (based on physical dimensions of the pore opening in the machine direction (MD) (length), and transverse machine direction (TD)(width) by measuring, for example, one or more of the pores (preferably several of the pores to ascertain an average) in SEMs of the surface, top or front (A side) of selected membranes or composites, for example, monolayer, bi-layer or tri-layer membranes:

Typical:

MD/TD aspect ratio in range of 0.75 to 1.50

Preferred:

MD/TD aspect ratio in range of 0.75 to 1.25

Most Preferred:

MD/TD aspect ratio in range of 0.85 to 1.25

In accordance with at least selected porous material or porous membrane embodiments of the present invention, if the MD/TD pore aspect ratio were 1.0, then a three-dimensional or 3D pore sphericity factor or ratio (MD/TD/ND) range could be: 1.0 to 8.0 or more; possibly preferred 1.0 to 2.5; and, most possibly preferred 1.0 to 2.0 or less (based on physical dimensions of the pore openings in the machine direction (MD) (length), transverse machine direction (TD) (width) and thickness direction or cross section (ND) (thickness); for example, measuring the MD and TD of one or more pores (preferably several pores to ascertain an average) in SEMs of the surface, top or front (A side), or the surface, bottom or back (B side), and measuring the ND of one or more pores (preferably several pores to ascertain an average) in SEMs of the cross-section, depth, or height (C side)(either length or width cross-section or both)(the ND dimension may be of a different pore than the MD and TD dimension as it may be difficult to measure the ND, MD and TD dimension of the same pore).

In accordance with at least selected porous material or porous membrane embodiments of the present invention, the pores (openings) have the following pore aspect ratios (based on physical dimensions of the pore opening in the machine direction (MD) (length), and transverse machine direction (TD)(width) based on measuring the pores in SEMs of the top or front (A side) of selected mono-layer and tri-layer membranes:

Typical Numbers for Aspect Ratio Range of Machine Direction MD (Length) and Transverse Direction TD (Width):

MD/TD aspect ratio in range of 0.75 to 1.50

In accordance with at least selected porous material or porous membrane embodiments of the present invention, the pores (openings) have the following three dimensional or 3D pore sphericity factors or ratios (based on physical dimensions of the pore openings in the machine direction (MD) (length), transverse machine direction (TD)(width) and thickness direction or cross section (ND)(thickness); for example, measuring one or more pores (preferably several pores to ascertain an average) in SEMs of the surface, top or front (A side), the surface, bottom or back (B side), and the cross-section, depth, or height (C side)(either length or width cross-section or both) (the ND dimension may be of a different pore than the MD and TD dimension as it may be difficult to measure the ND, MD and TD dimension of the same pore) of selected membranes, layers or composites, for example, of selected mono-layer and tri-layer membranes:

For example:

Typical:

MD/TD aspect ratio in range of 0.75 to 1.50
MD/ND dimension ratio in range of 0.50 to 7.50
TD/ND dimension ratio in range of 0.50 to 5.00

Preferred:

MD/TD aspect ratio in range of 0.75 to 1.25
MD/ND dimension ratio in range of 1.0 to 2.5
TD/ND dimension ratio in range of 1.0 to 2.5

Most Preferred:

MD/TD aspect ratio in range of 0.85 to 1.25
MD/ND dimension ratio in range of 1.0 to 2.0
TD/ND dimension ratio in range of 1.0 to 2.0

In accordance with at least selected porous material or porous membrane embodiments of the present invention, the pores (openings) have the following pore sphericity factors or ratios (based on physical dimensions of the pore opening in the machine direction (MD)(length), transverse machine direction (TD)(width) and thickness direction or cross section (ND)(thickness) based on measuring the pores in SEMs of the top or front (A side) and the length and with cross-sections (C side) of selected mono-layer and tri-layer membranes:

Typical Numbers for Sphericity Factor or Ratio Range of Machine Direction MD (Length), Transverse Direction TD (Width), and Thickness Direction ND (Vertical Height):

MD/TD aspect ratio in range of 0.75 to 1.50
MD/ND dimension ratio in range of 0.50 to 7.50
TD/ND dimension ratio in range of 0.50 to 5.00

In accordance with at least selected embodiments of the present invention, a microporous membrane is made by a dry-stretch process and has substantially round shaped pores and a ratio of machine direction tensile strength to transverse direction tensile strength in the range of 0.5 to 6.0, preferably 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax.

In accordance with at least selected embodiments of the present invention, a porous membrane is made by a modified dry-stretch process and has substantially round shaped pores, a ratio of machine direction tensile strength to transverse direction tensile strength in the range of 0.5 to 6.0, and has low Gurley as compared to prior dry-stretch membranes, has larger and more uniform mean flow pore diameters as compared to prior dry-stretch membranes, or both low Gurley and larger and more uniform mean flow pore diameters.

While certain membranes made by the conventional dry-stretch process have met with excellent commercial success, in accordance with at least selected embodiments of the present invention, there is provided improved, modified or enhanced at least selected physical attributes thereof, so that they may be used in a wider spectrum of applications, may perform better for particular purposes, and/or the like.

While at least certain air filters have met with commercial success, in accordance with at least selected embodiments of the present invention, there is provided improved, modified or enhanced filtration media so that they may be used in a wider spectrum of filtration or separation applications, may perform better for particular purposes, and/or the like.

While at least certain flat sheet porous materials for filtration or separation processes have met with commercial success, in accordance with at least selected embodiments of the present invention, there is provided improved, modified or enhanced porous materials so that they may be used in a wider spectrum of applications, may perform better for particular purposes, and/or the like.

While certain porous materials for the selective passage of gases or humidity (moisture vapor) and blockage of liquid water or salt water may have met with commercial success, such as RO membranes sold by Dow Chemical, ePTFE membranes sold by W.L. Gore, BHA, and others, in accordance with at least selected embodiments of the present invention, there is provided improved, modified or enhanced porous materials so that they may be used in a wider spectrum of applications, may perform better for particular purposes, and/or the like.

In accordance with at least selected embodiments of the present invention, an air-filter cartridge includes at least one pleated porous membrane such as a microporous membrane.

DESCRIPTION OF THE DRAWINGS

For the purpose of illustrating the various aspects or embodiments of the invention, there is shown in the drawings a form that is presently exemplary; it being understood, however, that the invention is not limited to the embodiments, precise arrangements or instrumentalities shown.

FIGS. 38 and 39 are respective photographs (SEM cross section photomicrographs at 20,000× and 3,420× magnification) of the membrane Sample G of FIGS. 32 to 37.

FIG. 40 is a photograph (SEM cross section photomicrograph at 615× magnification) of the membrane Sample G of FIGS. 32 to 39 with the nonwoven PP layer on top (inverted).

FIG. 40A is a photograph (SEM cross section photomicrograph at 3,420× magnification) of a portion of the monolayer PP layer of the membrane Sample G of FIG. 40 (note the rectangle in FIG. 40).

DESCRIPTION OF THE INVENTION

In accordance with at least selected embodiments of the present invention, a microporous membrane is made by a preferred modified dry-stretch process (biaxially oriented process) and has substantially round shaped pores and a ratio of machine direction tensile strength to transverse direction tensile strength in the range of 0.5 to 6.0, preferably 0.5 to 5.0, most preferably 0.5 to 4.0. A porous membrane such as a microporous membrane is a thin, pliable, polymeric sheet, foil, or film having a plurality of pores therethrough. Such membranes may be single or multiple plies, single or multiple layers, composites, laminates, or the like and may be used in a wide variety of applications, including, but not limited to, mass transfer membranes, pressure regulators, filtration membranes, medical devices, separators for electrochemical storage devices, membranes for use in fuel cells, and/or the like.

At least selected embodiments of the membrane of the present invention are made by a modified version of the dry-stretch process (also known as the CELGARD process). The dry-stretch process refers to a process where pore formation results from stretching the nonporous precursor. See, Kesting, R., *Synthetic Polymeric Membranes, A structural perspective*, Second Edition, John Wiley & Sons, New York, NY, (1985), pages 290-297, incorporated herein by reference. The dry-stretch process is distinguished from the wet process and particle stretch process, as discussed above.

At least selected membrane embodiments of the present invention may be distinguished from prior dry-stretched membranes in at least two ways: 1) substantially round shape pores, and 2) a ratio of machine direction tensile strength to transverse direction tensile strength in the range of 0.5 to 6.0, preferably 0.5 to 5.0, most preferably 0.5 to 4.0.

At least selected membrane embodiments of the present invention may be distinguished from prior dry-stretched membranes in at least five ways: 1) substantially round shape pores, 2) a ratio of machine direction tensile strength to transverse direction tensile strength in the range of 0.5 to 6.0, 3) mean flow pore diameters in the range of 0.025 to 0.150 um, 4) high gas or moisture permeability, with JIS Gurley in the range of 0.5 to 200 seconds, and (5) hydrohead pressure higher than 140 psi.

Figure 1:
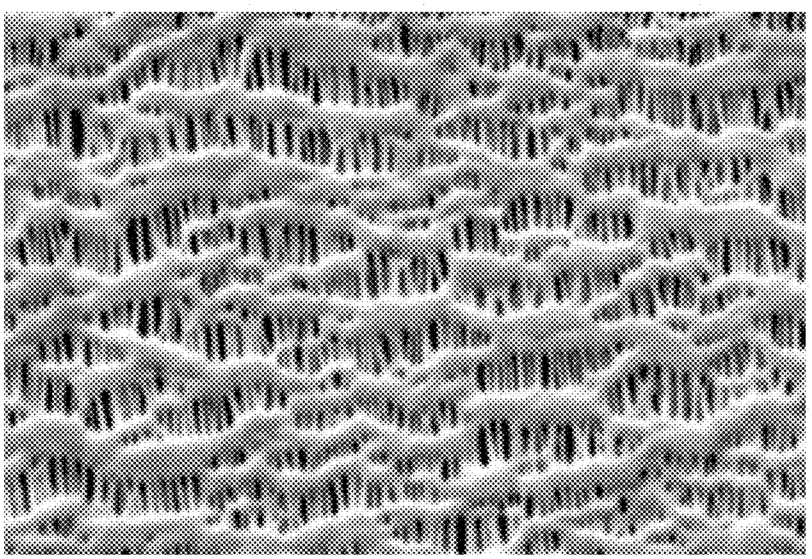
FIG. 1 is a photograph (SEM surface photomicrograph) of a CELGARD® monolayer, conventional dry-stretch, polypropylene, battery separator.
Figure 2:
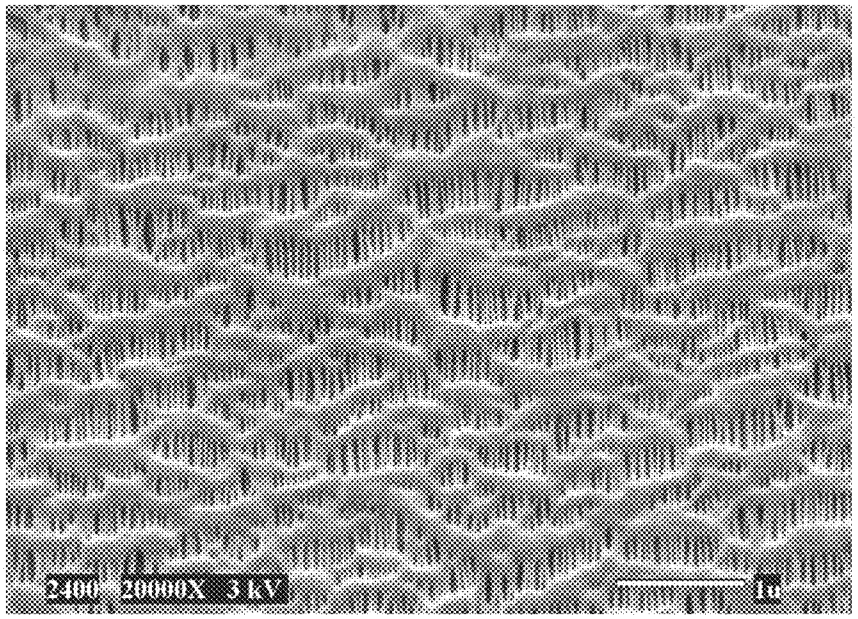
FIG. 2 is a photograph of a prior art dry-stretched membrane (single ply membrane).
Figure 3:
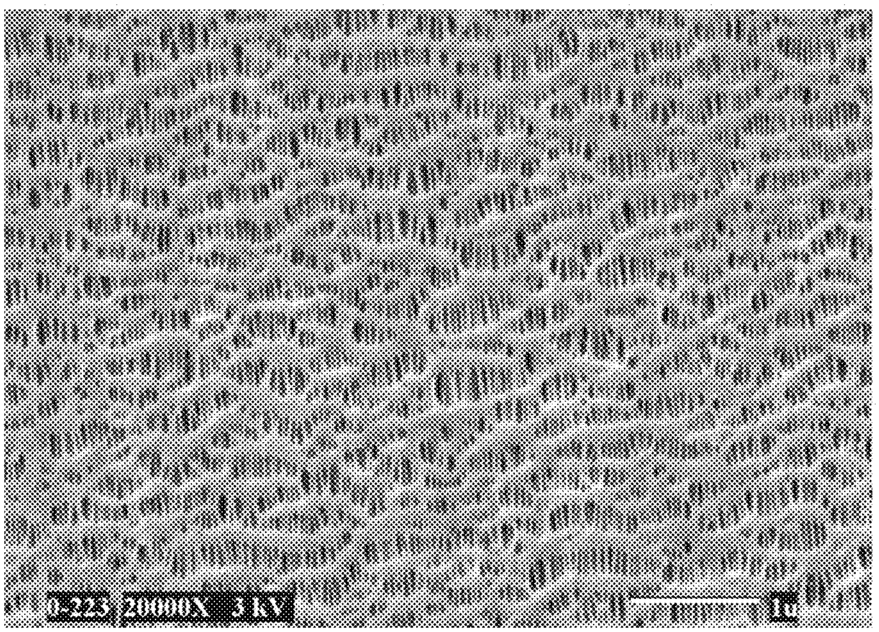
FIG. 3 is a photograph of a prior art dry-stretched membrane (multi-ply membrane, plies laminated then stretched).
Figure 4:
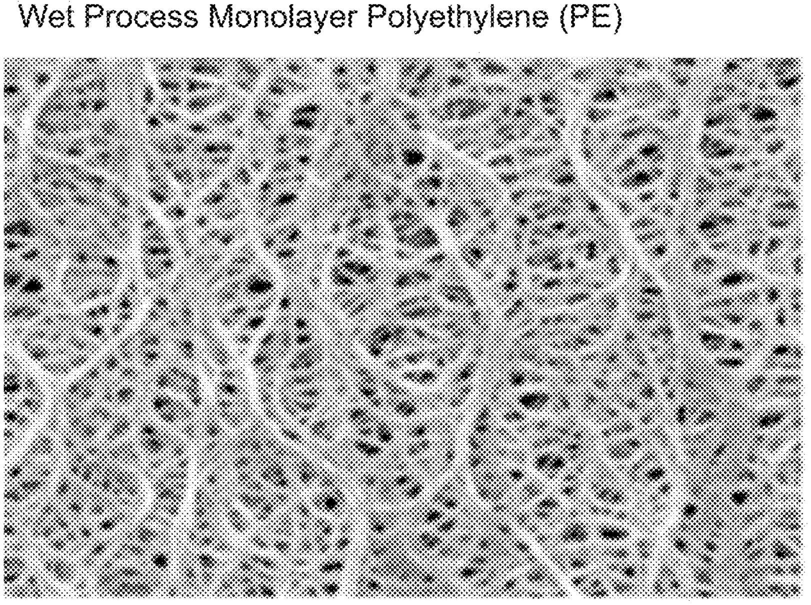
FIG. 4 is a photograph (SEM surface photomicrograph) of a CELGARD® monolayer, wet process, polyethylene battery separator.
Figure 5A:
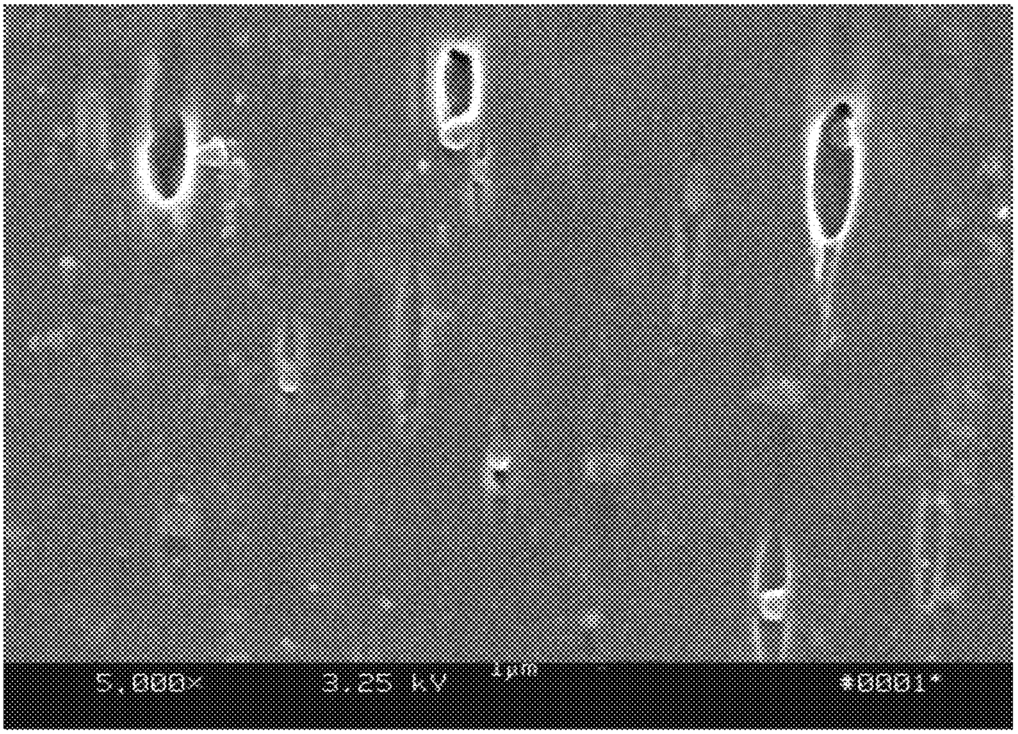
FIG. 5A is a photograph (SEM surface photomicrograph) of a particle stretch membrane.
Figure 5B:
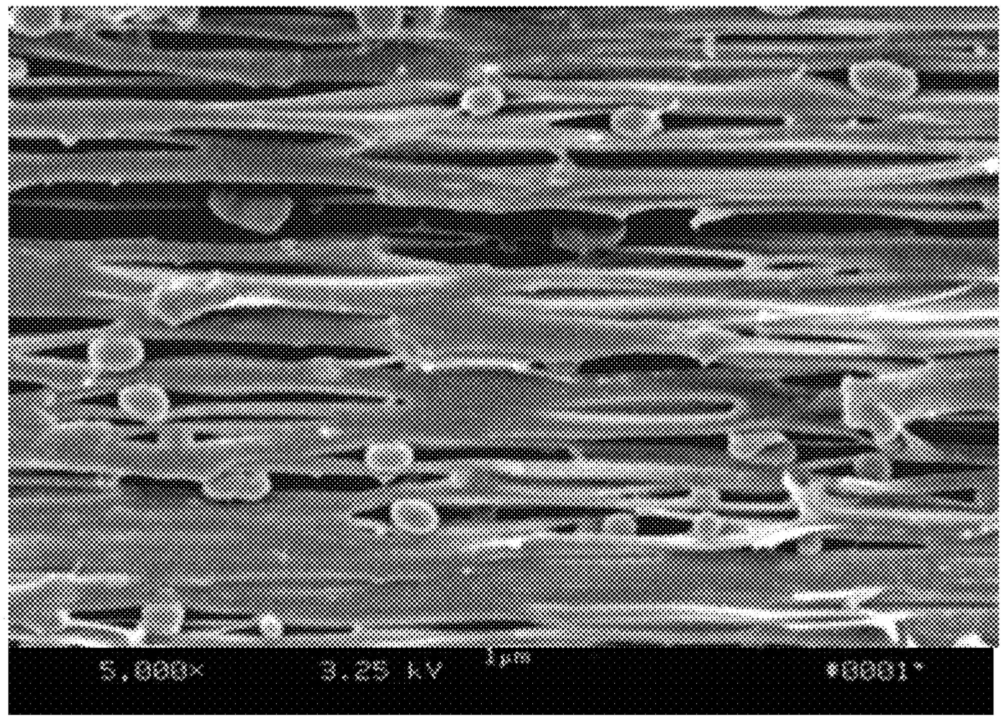
FIG. 5B is a photograph (SEM cross-section photomicrograph) of a particle stretch membrane.
Figure 6:
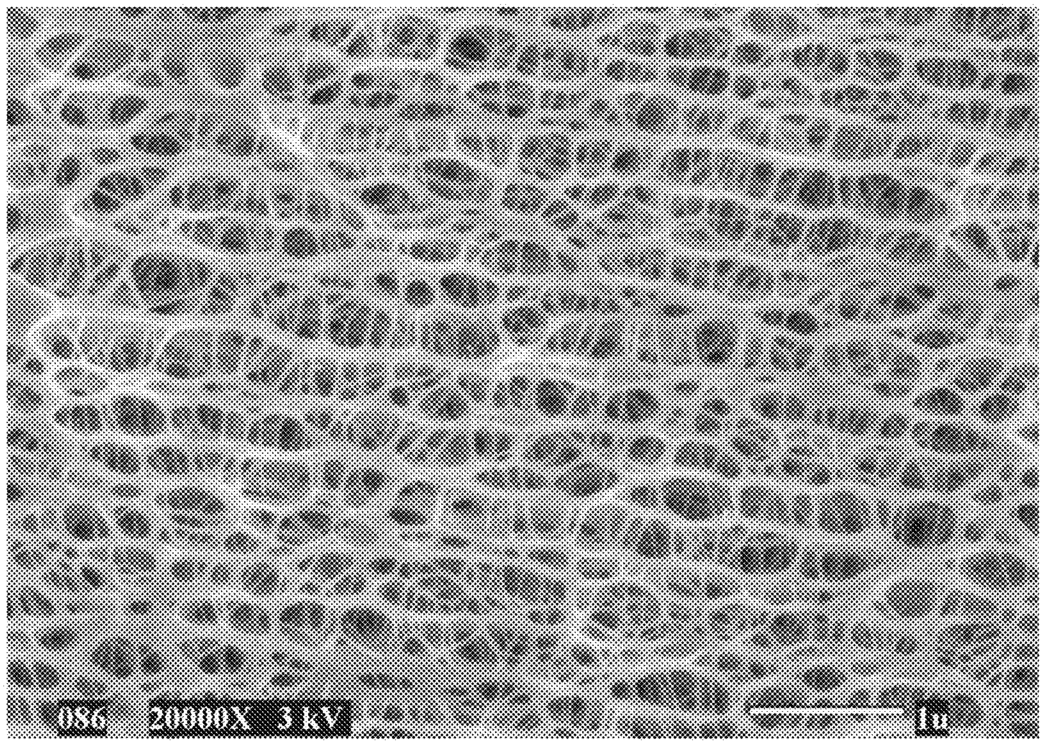
FIG. 6 is a photograph (SEM surface photomicrograph) of a membrane in accordance with one embodiment of the present invention (single ply membrane, biaxially oriented process).
Figure 7:
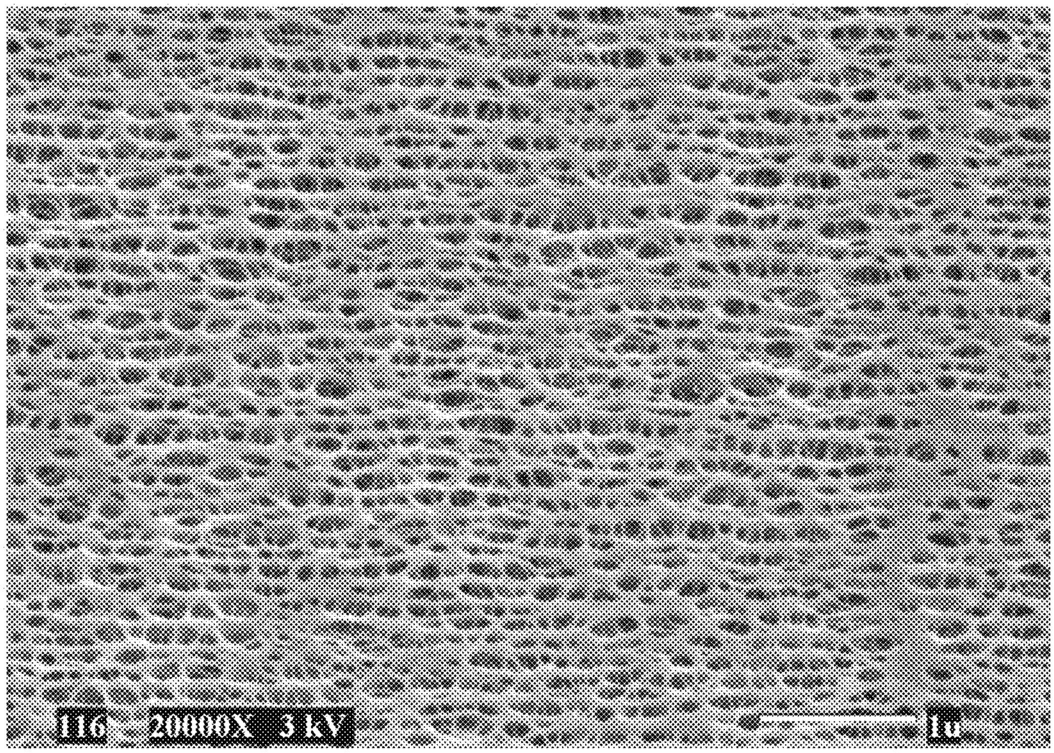
FIG. 7 is a photograph (SEM surface photomicrograph) of a membrane in accordance with another embodiment of the present invention (multi-ply membrane, plies laminated together then stretched, biaxially oriented process).
Figure 8:
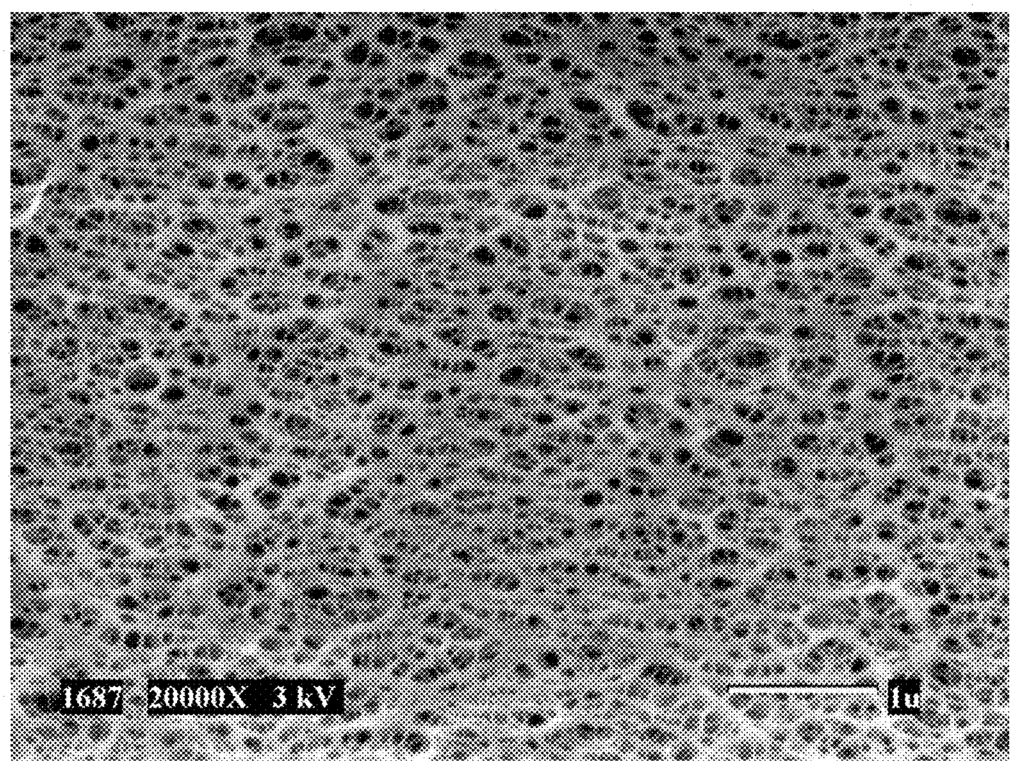
FIG. 8 is a photograph (SEM surface photomicrograph) of a membrane in accordance with yet another embodiment of the instant invention (multi-ply membrane, plies coextruded then stretched, biaxially oriented process).
Figure 9:
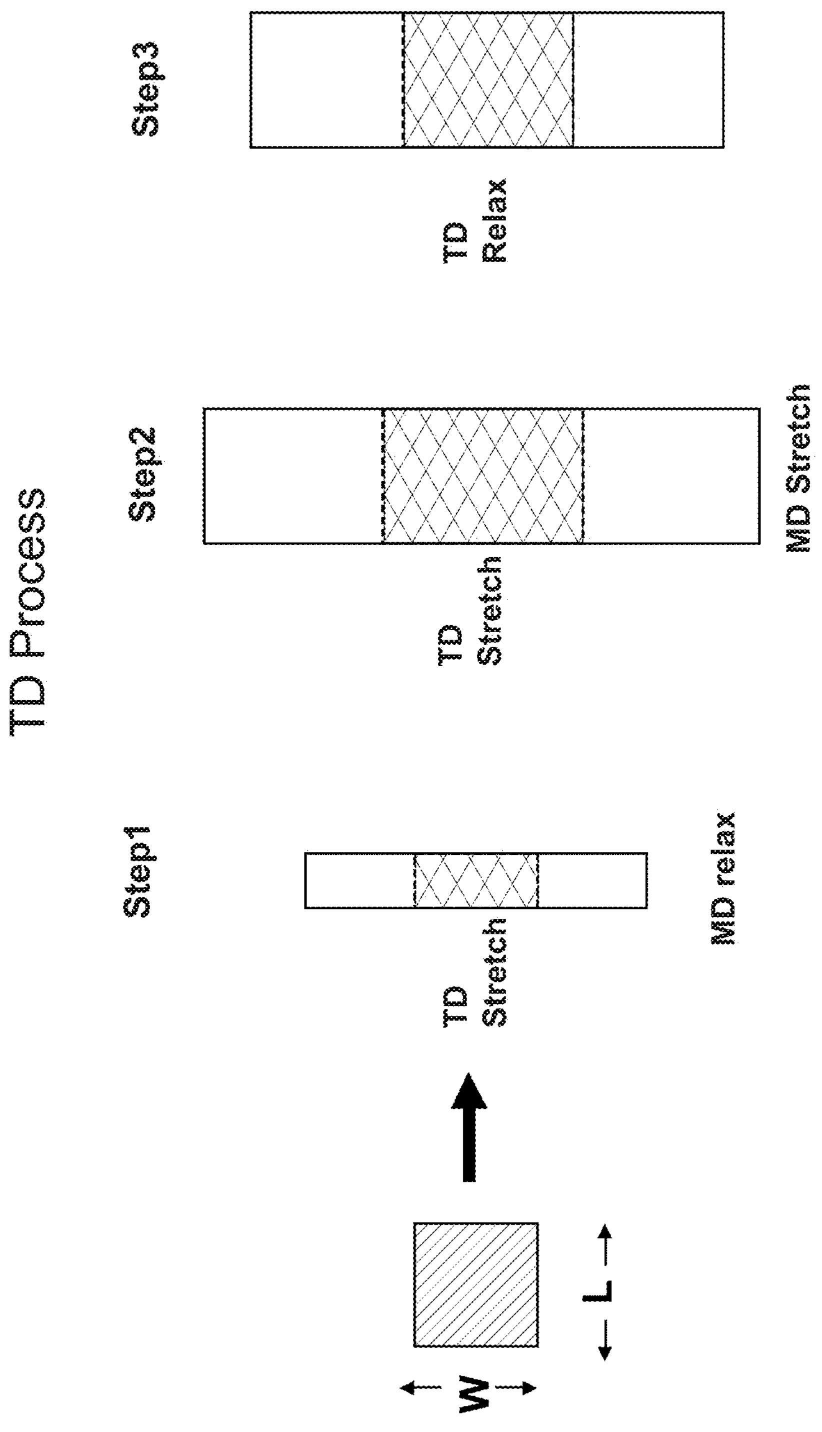
FIG. 9 is a schematic representation of exemplary TD stretch processes in accordance with at least one embodiment of the biaxially oriented membrane manufacturing method of the present invention.
Figure 10:
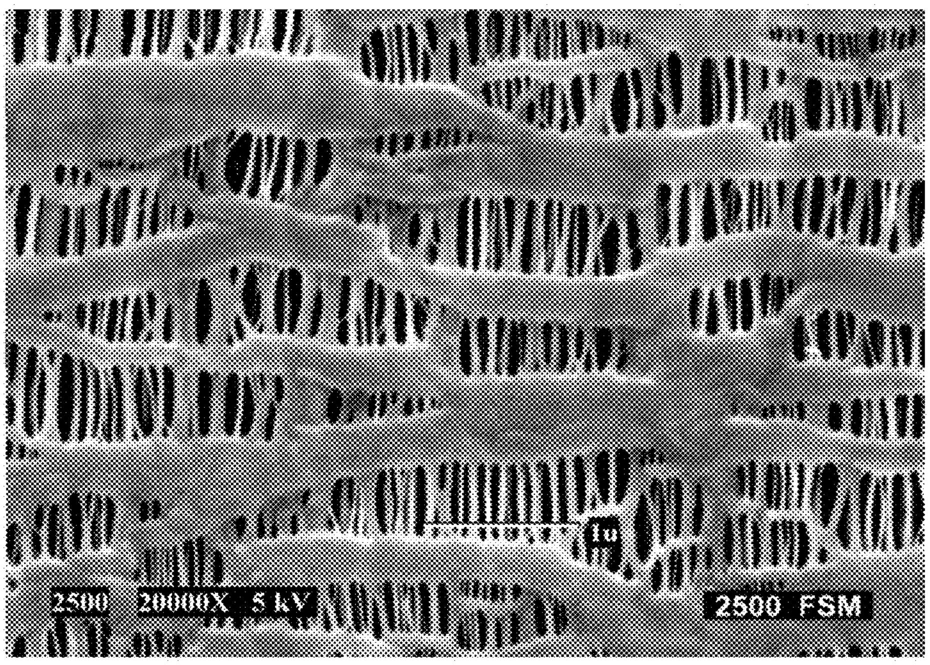
FIG. 10 is a photograph (SEM surface photomicrograph) of a conventional CELGARD® 2500 membrane (PP monolayer, dry-stretch process) at 20,000× magnification.
Figure 11:
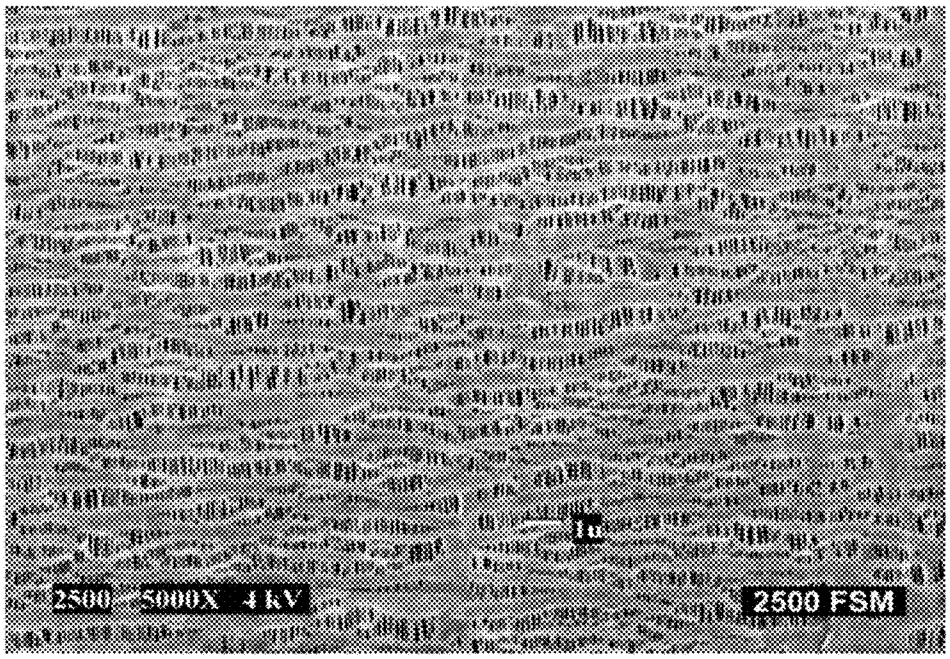
FIG. 11 is a photograph (SEM surface photomicrograph) of the membrane of FIG. 10 at 5,000× magnification.
Figure 12:
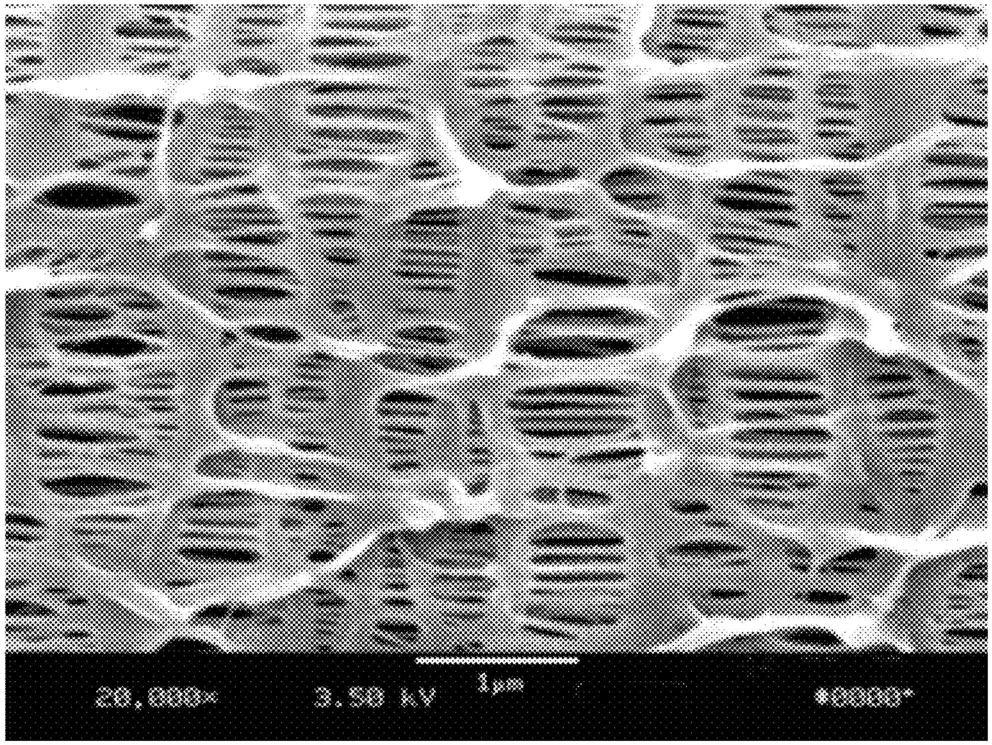
FIG. 12 is a photograph (SEM cross section photomicrograph) of the membrane of FIGS. 10 and 11 at 20,000× magnification.
Figure 13:
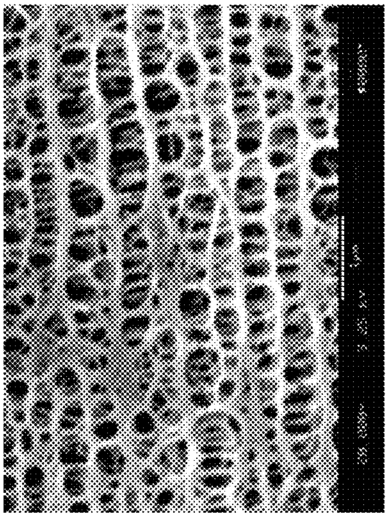
FIGS. 13 and 14 are respective photographs (SEM surface A (top) photomicrographs at 20,000× and 5,000× magnification) of a membrane Sample B in accordance with another membrane embodiment of the instant invention (PP monolayer, collapsed bubble, biaxially oriented process).
Figure 14:
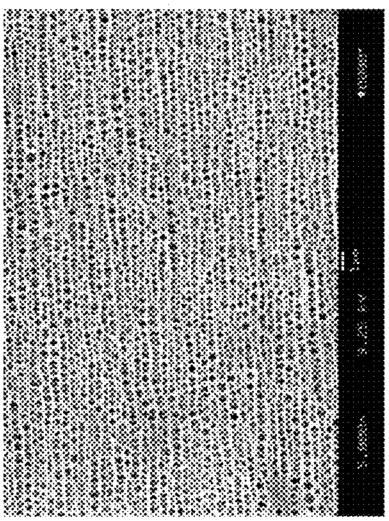
Figure 15:
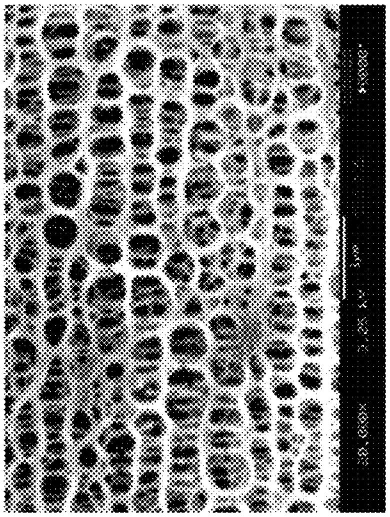
FIGS. 15 and 16 are respective photographs (SEM surface B (bottom) photomicrographs at 20,000× and 5,000× magnification) of the membrane Sample B of FIGS. 13 and 14.
Figure 16:
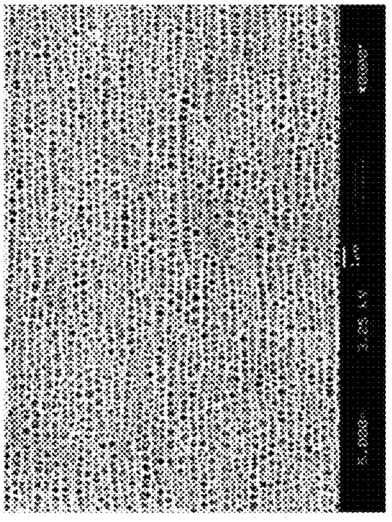
Figure 17:
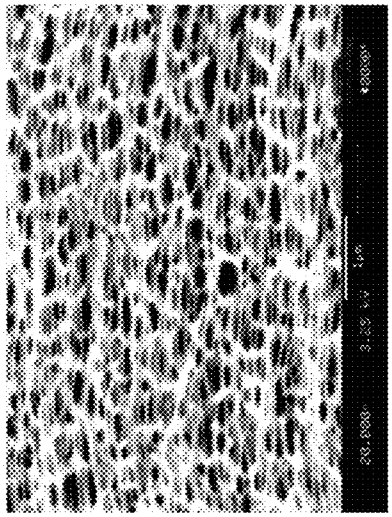
FIGS. 17 and 18 are respective photographs (SEM cross section photomicrographs at 20,000× and 5,000× magnification) of the membrane Sample B of FIGS. 13 to 16.
Figure 18:
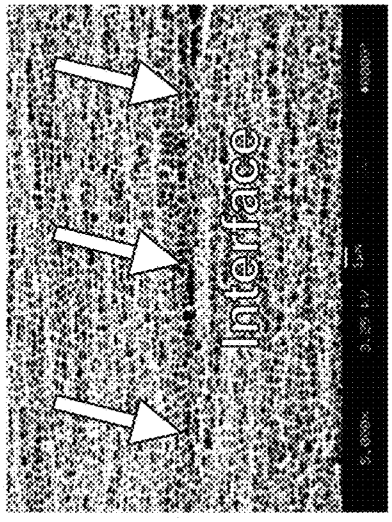
Figure 19:
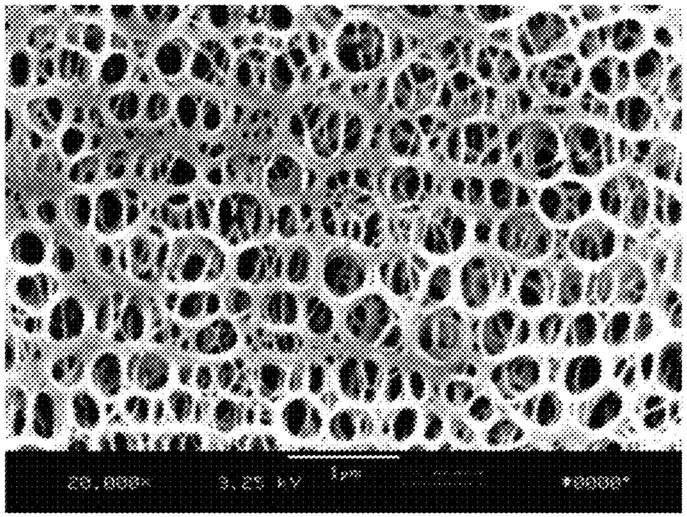
FIGS. 19, 20 and 21 are respective photographs (SEM surface A (top) photomicrographs at 20,000×, 5,000× and 1,000× magnification) of a membrane Sample C in accordance with still another membrane or composite embodiment of the instant invention (PP monolayer [of Sample B]/nonwoven PP, laminated [heat+pressure]).
Figure 20:
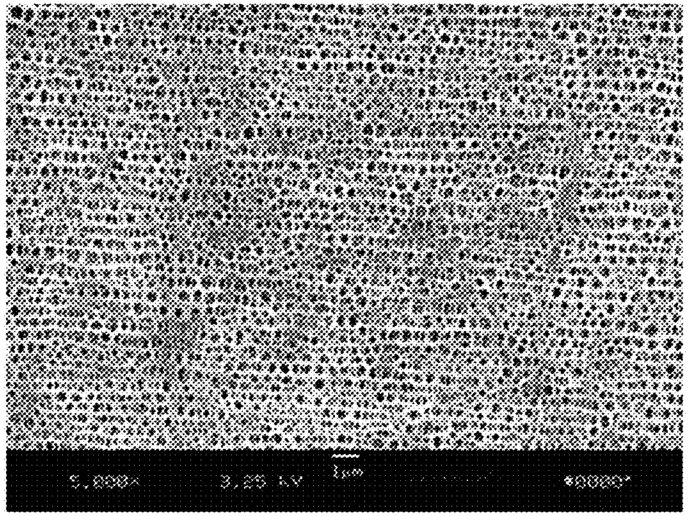
Figure 21:
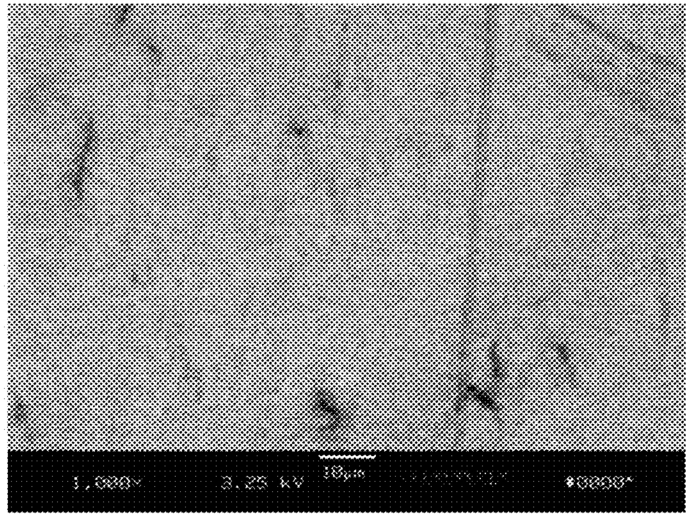
Figure 22:
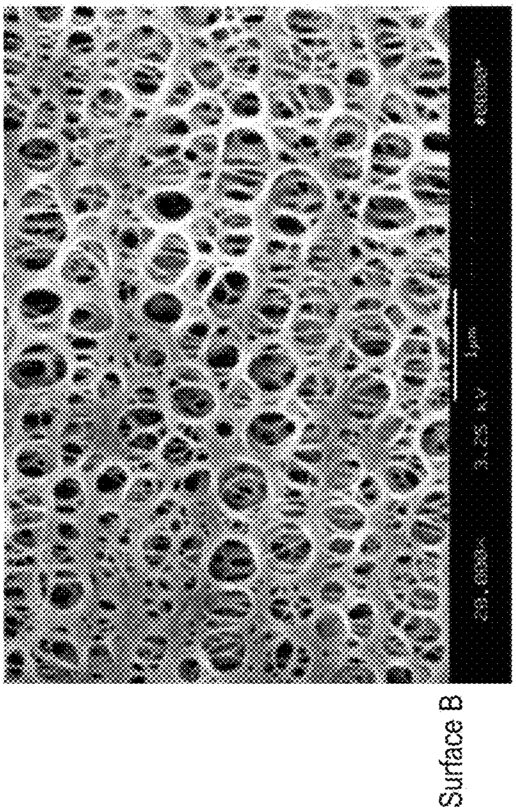
FIGS. 22, 23 and 24 are respective photographs (SEM surface B (bottom) photomicrographs at 20,000×, 5,000× and 1,000× magnification) of the membrane Sample C of FIGS. 19 to 21.
Figure 23:
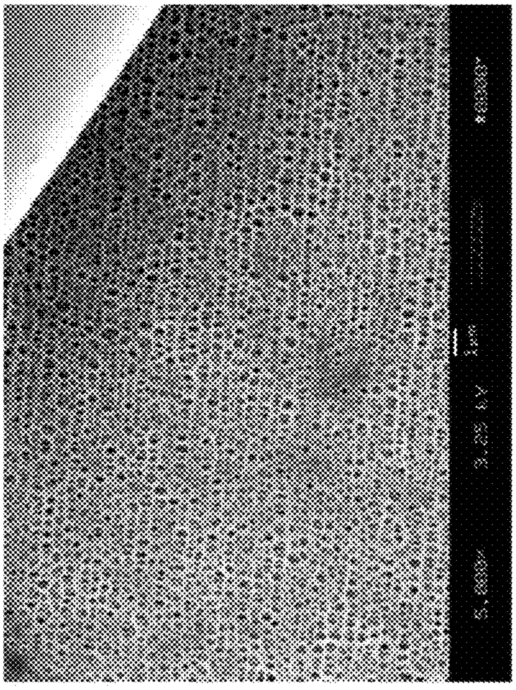
Figure 24:
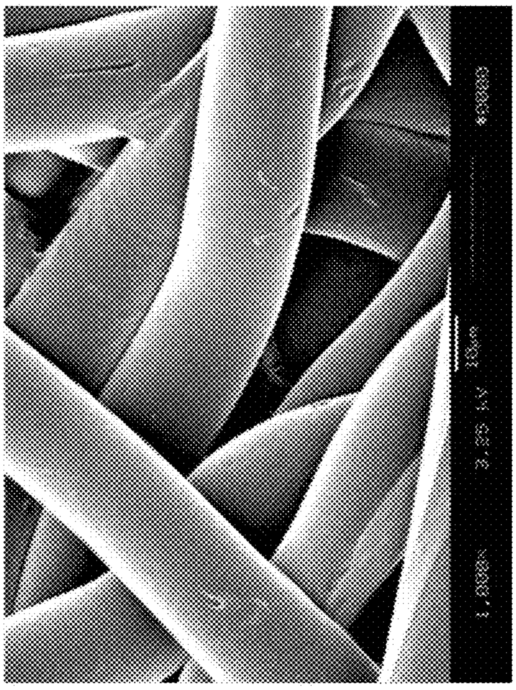
Figure 25:
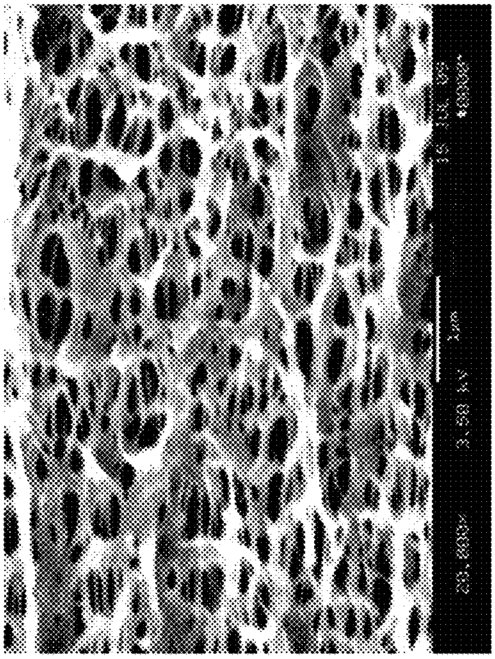
FIGS. 25 and 26 are respective photographs (SEM cross section photomicrographs at 20,000× and 5,000× magnification) of the membrane Sample C of FIGS. 19 to 24.
Figure 26:
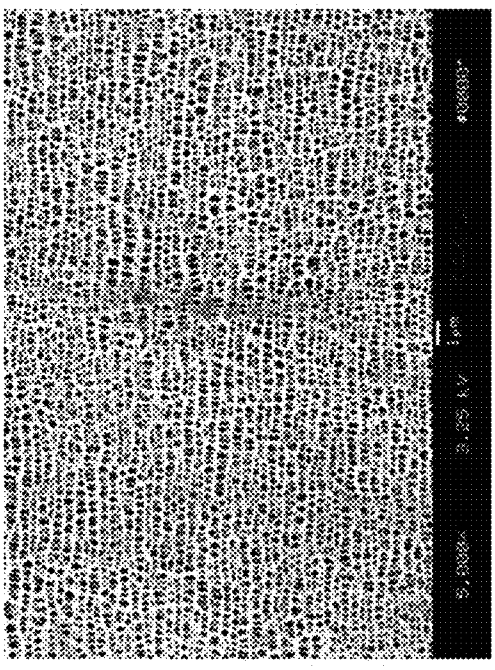
Figure 27:
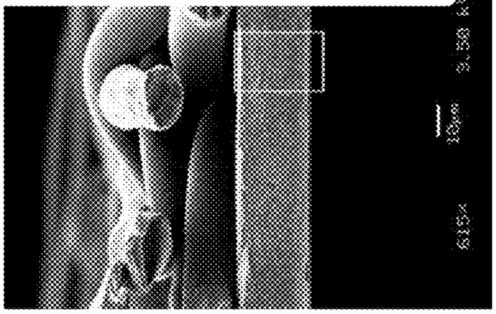
FIG. 27 is a photograph (SEM cross section photomicrograph at 615× magnification) of the membrane Sample C of FIGS. 19 to 26 with the nonwoven PP layer on top (inverted).
Figure 27A:
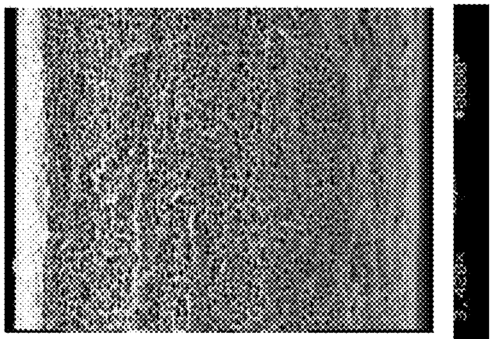
FIG. 27A is a photograph (SEM cross section photomicrograph at 3,420× magnification) of a portion of the monolayer PP layer of the membrane Sample C of FIG. 27 (note the rectangle in FIG. 27).
Figure 28:
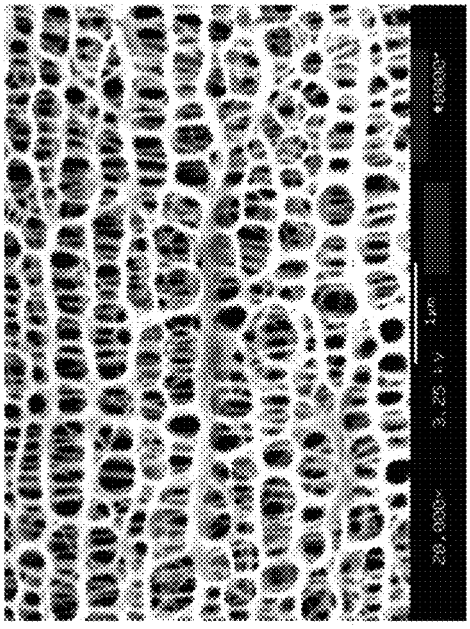
FIGS. 28 and 29 are respective photographs (SEM surface A (top) photomicrographs at 20,000× and 5,000× magnification) of a membrane Sample A in accordance with yet another membrane embodiment of the instant invention (monolayer PP, non-collapse bubble, biaxially oriented process).
Figure 30:
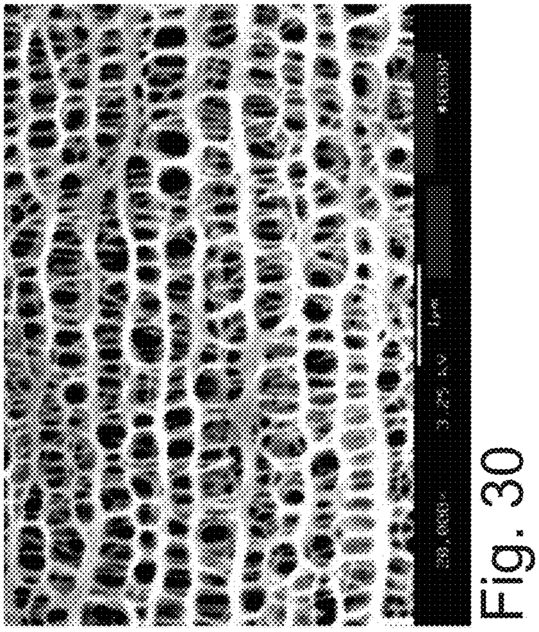
FIGS. 30 and 31 are respective photographs (SEM surface B (bottom) photomicrographs at 20,000× and 5,000× magnification) of the membrane Sample A of FIGS. 28 and 29.
Figure 29:
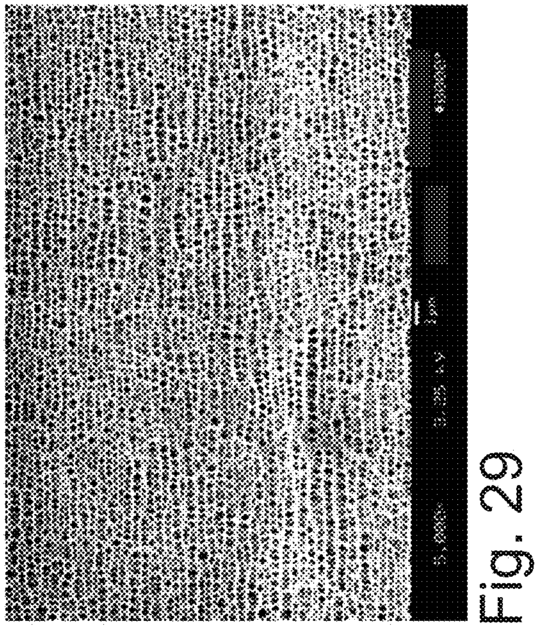
Figure 31:
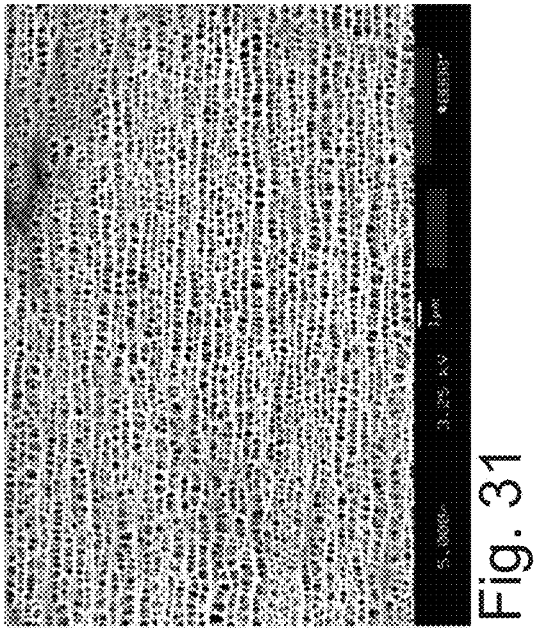
Figure 32:
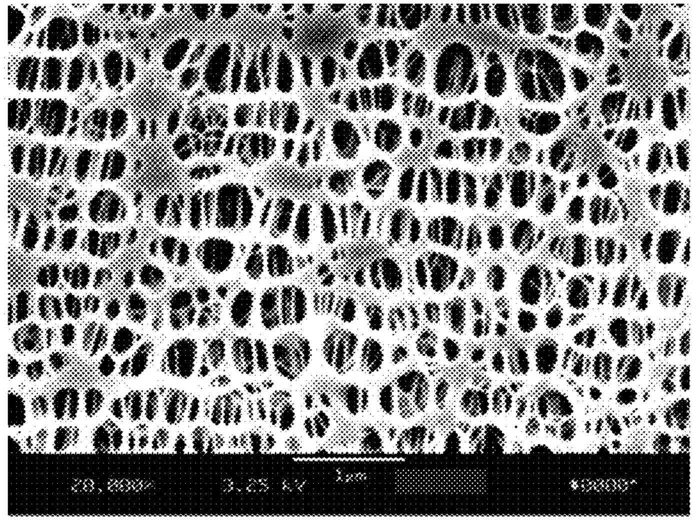
FIGS. 32, 33 and 34 are respective photographs (SEM surface A (top) photomicrographs at 20,000×, 5,000× and 1,000× magnification) of a membrane or composite Sample G in accordance with another embodiment of the instant invention (PP monolayer, non-collapse bubble, biaxially oriented process [of Sample A]/nonwoven PP, laminated [heat+pressure]).
Figure 33:
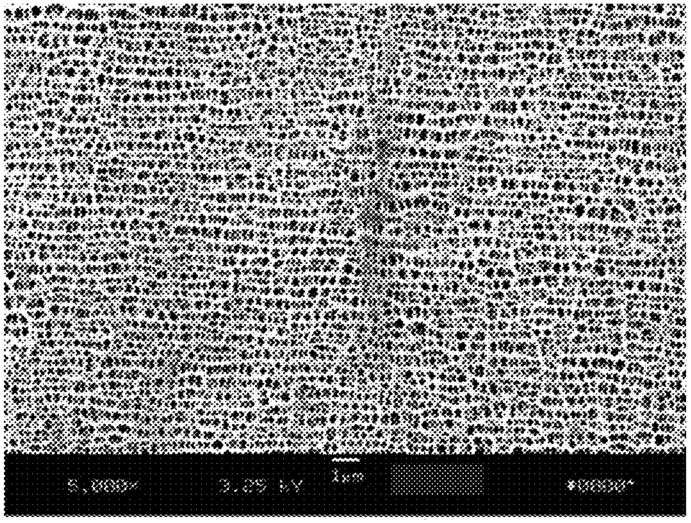
Figure 34:
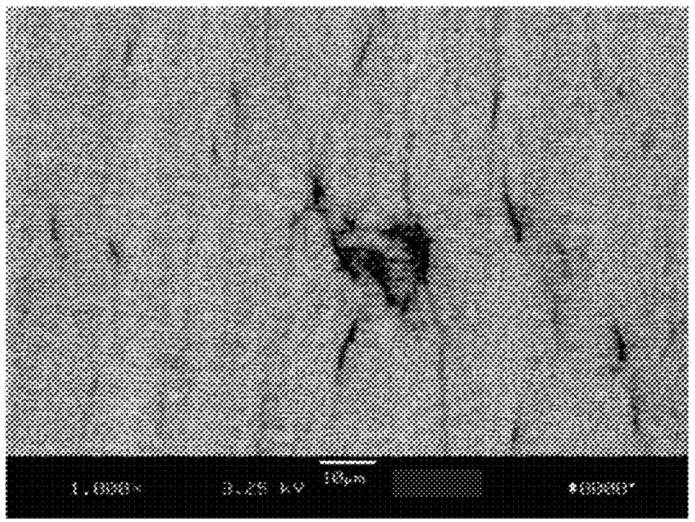
Figure 35:
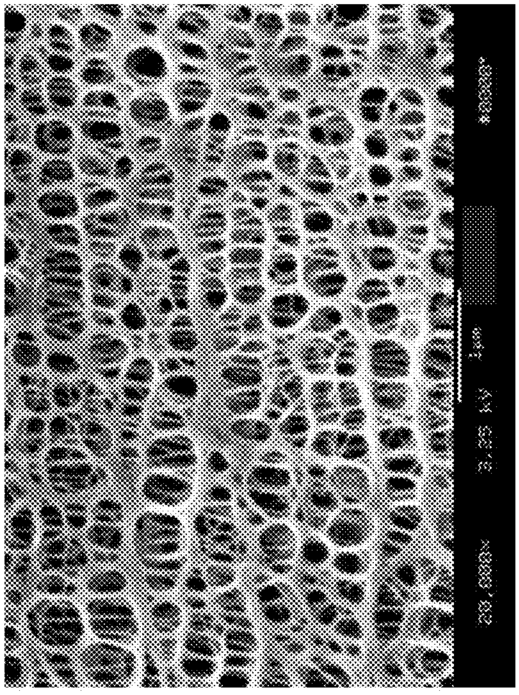
FIGS. 35, 36 and 37 are respective photographs (SEM surface B (bottom) photomicrographs at 20,000×, 5,000× and 1,000× magnification) of the membrane Sample G of FIGS. 32 to 34.
Figure 36:
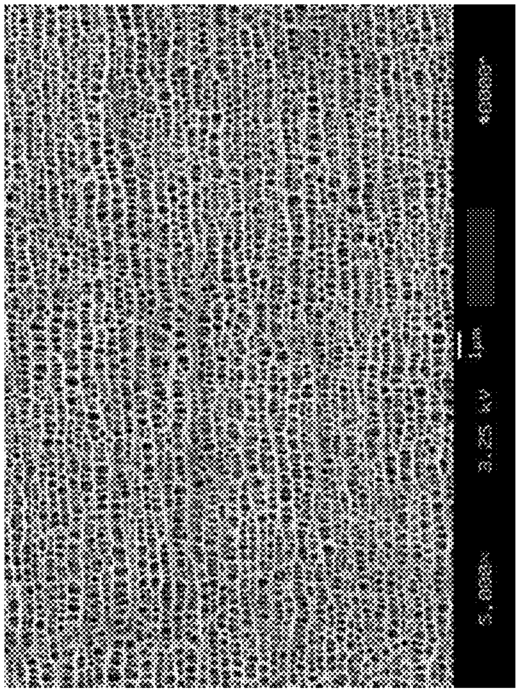
Figure 37:
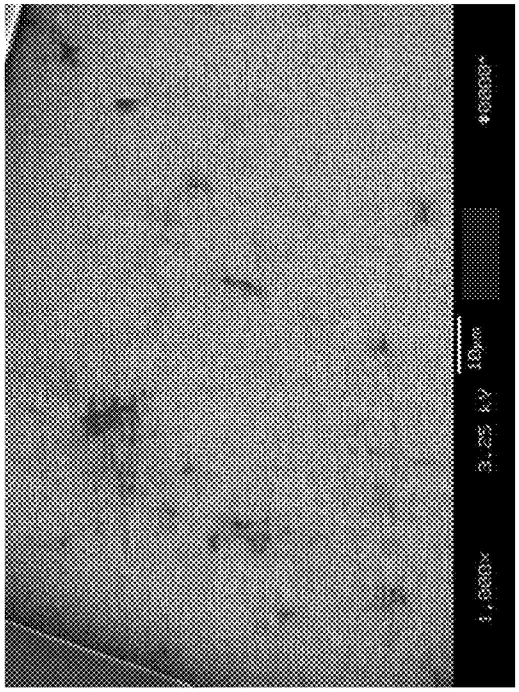
Figure 41:
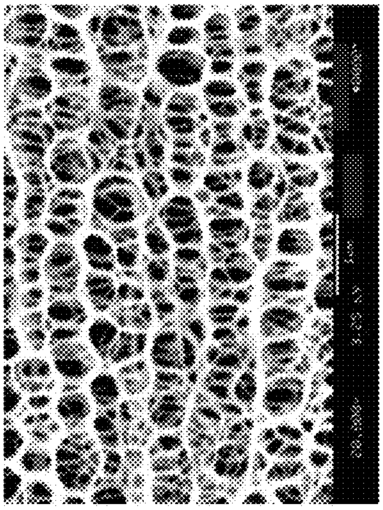
FIGS. 41 and 42 are respective photographs (SEM surface A (top) photomicrographs at 20,000× and 5,000× magnification) of a membrane Sample E in accordance with still another membrane embodiment of the instant invention (PP monolayer, collapsed bubble, biaxially oriented process).
Figure 42:
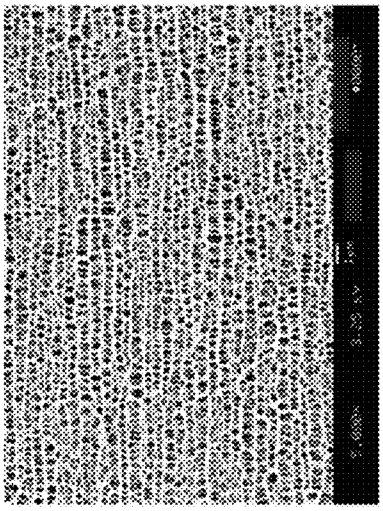
Figure 43:
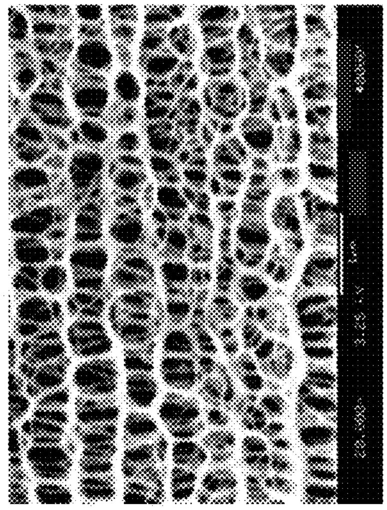
FIGS. 43 and 44 are respective photographs (SEM surface B (bottom) photomicrographs at 20,000× and 5,000× magnification) of the membrane Sample E of FIGS. 41 and 42.
Figure 44:
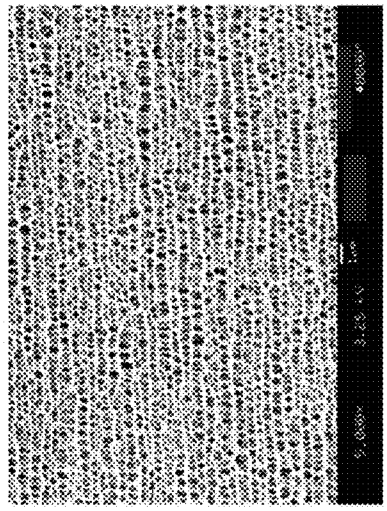
Figure 45:
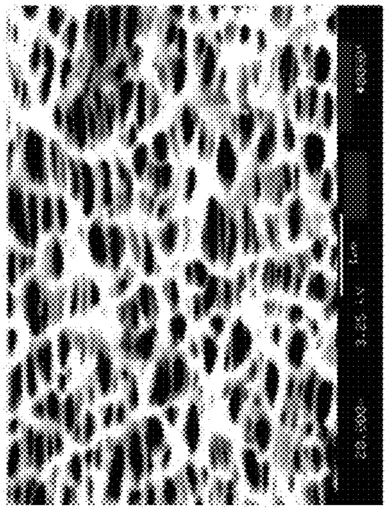
FIGS. 45 and 46 are respective photographs (SEM cross section photomicrographs at 20,000× and 5,000× magnification) of the membrane Sample E of FIGS. 41 to 44.
Figure 46:
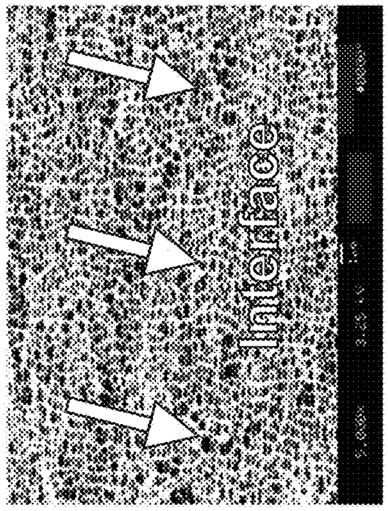
Figure 47:
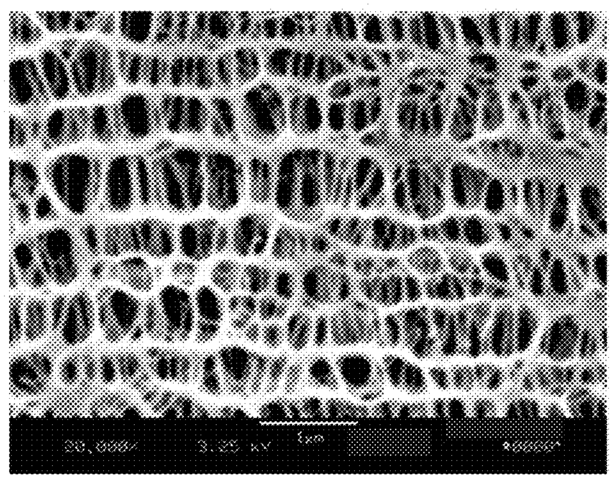
FIGS. 47 and 48 are respective photographs (SEM surface A (top) photomicrographs at 20,000× and 5,000× magnification) of a membrane Sample F in accordance with yet another membrane embodiment of the instant invention (monolayer PP, non-collapse bubble, biaxially oriented process).
Figure 49:
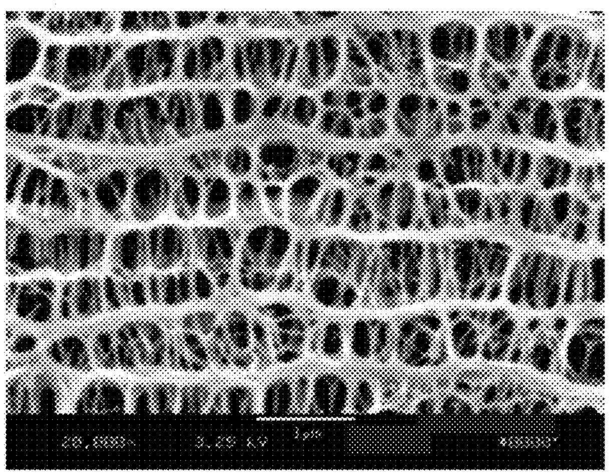
FIGS. 49 and 50 are respective photographs (SEM surface B (bottom) photomicrographs at 20,000× and 5,000× magnification) of the membrane Sample F of FIGS. 47 and 48.
Figure 48:
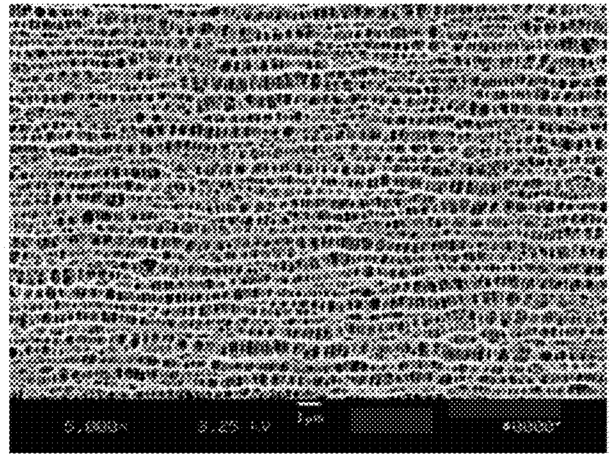
Figure 50:
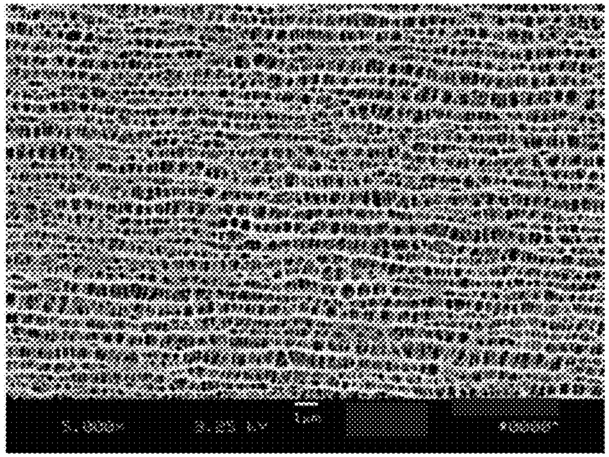
Figure 51:
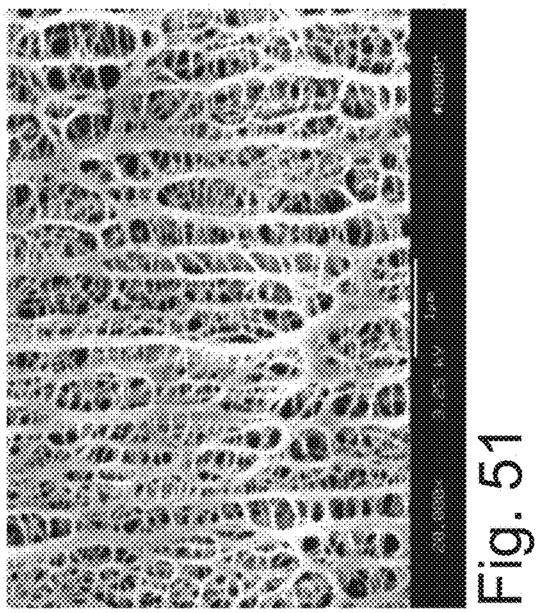
FIGS. 51 and 52 are respective photographs (SEM surface A (top) photomicrographs at 20,000× and 5,000× magnification) of a membrane Sample D in accordance with still yet another membrane embodiment of the instant invention (coextruded PP/PE/PP tri-layer, collapsed bubble, biaxially oriented process).
Figure 53:
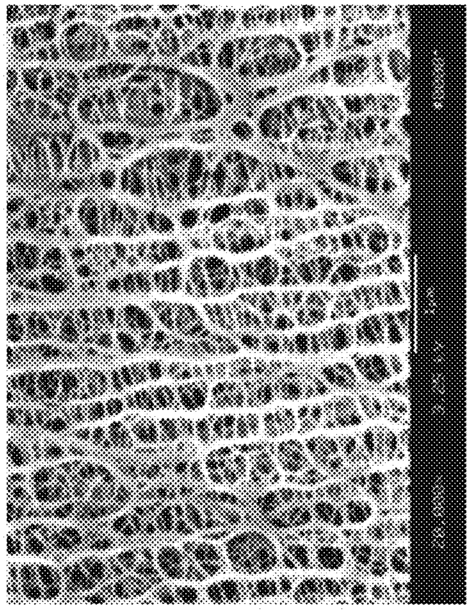
FIGS. 53 and 54 are respective photographs (SEM surface B (bottom) photomicrographs at 20,000× and 5,000× magnification) of the membrane Sample D of FIGS. 51 and 52.
Figure 52:
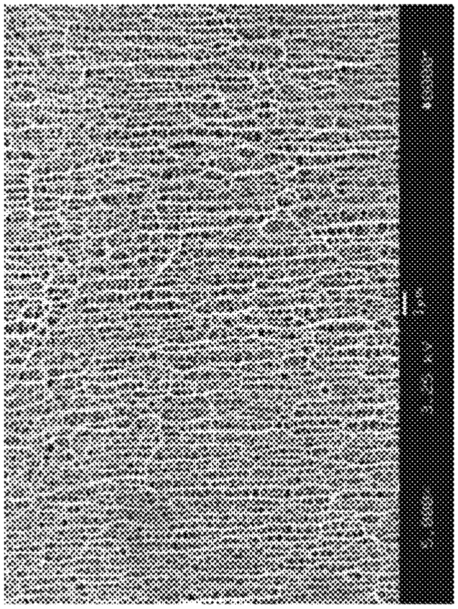
Figure 54:
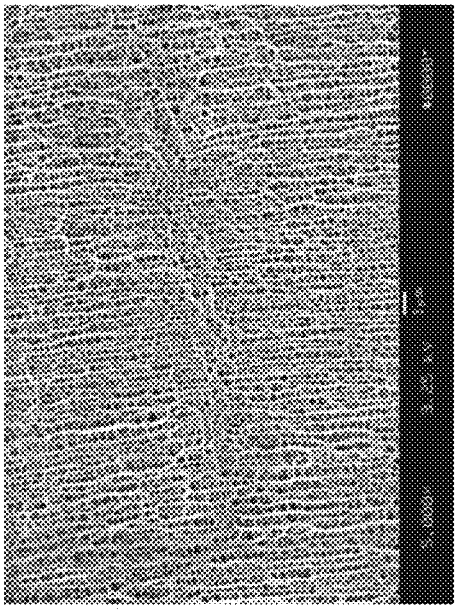

Regarding the pore shape, the pores are preferably characterized as substantially round shaped. See, for example, FIGS. 6-8, 13-16, 19, 20, 22, 23, 28-31, 32, 33, 35, 36, 41-44, 47-50, and 51-54. This pore shape is contrasted with the slit shaped pores of the prior conventional dry-stretched membranes. See FIGS. 1-3 and Kesting, *Ibid*. Further, the pore shape of the instant membrane may be characterized by an aspect ratio, the ratio of the length (MD) to the width (TD) of the pore. In one embodiment of the instant membrane, the aspect ratio ranges from 0.75 to 1.25. This is contrasted with the aspect ratio of the prior dry-stretched membranes which are greater than 5.0. See Table I below.

Regarding the ratio of machine direction (MD) tensile strength to transverse direction (TD) tensile strength, in one embodiment, this ratio is between 0.5 to 6.0, preferably 0.5 to 5.0. This ratio is contrasted with the corresponding ratio of the prior art membranes which is greater than 10.0. See Table I below.

U.S. Pat. No. 6,602,593 is directed to a microporous membrane, made by a dry-stretch process, where the resulting membrane has a ratio of transverse direction tensile strength to machine direction tensile strength of 0.12 to 1.2. Therein, the TD/MD tensile ratio is obtained by a blow-up ratio of at least 1.5 as the precursor is extruded.

At least selected embodiments of the instant membrane may be further characterized as follows: an average pore size in the range of 0.03 to 0.30 microns (μm); a porosity in the range of 20-80%; and/or a transverse direction tensile strength of greater than 250 $Kg/cm^2$. The foregoing values are exemplary values and are not intended to be limiting, and accordingly should be viewed as merely representative of at least selected embodiments of the instant membrane.

At least selected embodiments of the instant membrane may be further characterized as follows: a pore size in the range of 0.30 to 1.0 microns (μm); and an average aspect ratio in the range of about 1.0 to 1.10. The foregoing values are exemplary values and are not intended to be limiting, and accordingly should be viewed as merely representative of at least selected embodiments of the instant membrane.

At least selected possibly preferred embodiments of the instant membrane may be further characterized as follows: an average aquapore size in the range of 0.05 to 0.50 microns (μm); a porosity in the range of 40-90%; and/or a transverse direction tensile strength of greater than 250 $Kg/cm^2$. The foregoing values are exemplary values and are not intended to be limiting, and accordingly should be viewed as merely representative of at least selected possibly preferred embodiments of the instant membrane.

The preferred polymers used in the instant membrane may be characterized as thermoplastic polymers. These polymers may be further characterized as semi-crystalline polymers. In one embodiment, semi-crystalline polymer may be a polymer having a crystallinity in the range of 20% to 80%. Such polymers may be selected from the following group: polyolefins, fluorocarbons, polyamides, polyesters, polyacetals (or polyoxymethylenes), polysulfides, polyvinyl alcohols, co-polymers thereof, and combinations thereof. Polyolefins may be preferred and may include polyethylenes (LDPE, LLDPE, HDPE, UHMWPE), polypropylene, polybutene, polymethylpentene, co-polymers thereof, and blends thereof. Fluorocarbons may include polytetrafluoroethylene (PTFE), polychlorotrifluoroethylene (PCTFE), fluorinated ethylene propylene (FEP), ethylene chlortrifluoroethylene (ECTFE), ethylene tetrafluoroethylene (ETFE), polyvinylidene fluoride (PVDF), polyvinylfluoride (PVF), prefluoroalkoxy (PFA) resin, co-polymers thereof, and blends thereof. Polyamides may include, but are not limited to: polyamide 6, polyamide 6/6, Nylon 10/10, polyphthalamide (PPA), co-polymers thereof, and blends thereof. Polyesters may include polyester terephthalate (PET), polybutylene terephthalate (PBT), poly-1-4-cyclohexylenedimethylene terephthalate (PCT), and liquid crystal polymers (LCP). Polysulfides include, but are not limited to, polyphenylsulfide, co-polymers thereof, and blends thereof. Polyvinyl alcohols include, but are not limited to, ethylene-vinyl alcohol, co-polymers thereof, and blends thereof.

At least certain embodiments of the instant membrane may include other ingredients, as is well known. For example, those ingredients may include: fillers (inert particulates typically used to reduce the cost of the membrane, but otherwise having no significant impact on the manufacture of the membrane), anti-static agents, anti-blocking agents, anti-oxidants, lubricants (to facilitate manufacture), colorants, and/or the like.

Various materials may be added to the polymers to modify or enhance the properties of the membrane. Such materials include, but are not limited to: (1) polyolefins or polyolefin oligomers with a melting temperature less than 130° C.; (2) mineral fillers include, but are not limited to: calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide, and/or the like, and blends thereof; (3) elastomers include, but are not limited to: ethylene-propylene (EPR), ethylene-propylene-diene (EPDM), styrene-butadiene (SBR), styrene isoprene (SIR), ethylidene norbornene (ENB), epoxy, and polyurethane, and blends thereof; (4) wetting agents include, but are not limited to, ethoxylated alcohols, primary polymeric carboxylic acids, glycols (e.g., polypropylene glycol and polyethylene glycols), functionalized polyolefins, etc; (5) lubricants, for example, silicone, fluoropolymers, Kemamide®, oleamide, stearamide, erucamide, calcium stearate, or other metallic stearate; (6) flame retardants for example, brominated flame retardants, ammonium phosphate, ammonium hydroxide, alumina trihydrate, and phosphate ester; (7) cross-linking or coupling agents; (8) polymer processing aids (such as but not limited plasticizer or processing oil, for example, less than 10% by weight processing oil); and (9) any types of nucleating agents including beta-nucleating agents for polypropylene. (At least the preferred instant membrane, however, specifically excludes any beta-nucleated polypropylene (BNPP) as disclosed in U.S. Pat. No. 6,368,742, incorporated herein by reference. A beta-nucleating agent for polypropylene is a substance that causes the creation of beta crystals in polypropylene.)

The instant membrane may be a single ply or multi-ply membrane. Regarding the multi-ply membrane, the instant biaxially oriented membrane may be one ply or layer of the multi-ply membrane or the instant membrane may be all of the plies of the multi-ply membrane. If the instant membrane is less than all of the plies of the multi-ply membrane, the multi-ply membrane may be made via a coating, lamination or bonding process. If the instant membrane is all plies of the multi-ply membrane, the multi-ply membrane may be made via a lamination or extrusion process (such as coextrusion). Further, multi-ply membranes may be made of plies of the same materials or of differing materials.

The instant membrane is preferably made by a modified dry-stretch process where the precursor membrane is biaxially stretched (i.e., not only stretched in the machine direction, but also in the transverse machine direction). This process will be discussed in greater detail below.

In general, the process for making the foregoing membrane includes the steps of extruding a nonporous (single or multi-layer) precursor, and then biaxially stretching the nonporous precursor. Optionally, the nonporous precursor may be annealed prior to stretching. In one embodiment, the biaxial stretching includes a machine direction stretch and a transverse direction stretch with a simultaneous controlled machine direction relax. The machine direction stretch and the transverse direction stretch may be simultaneous or sequential. In one embodiment, the machine direction stretch is followed by the transverse direction stretch with the simultaneous machine direction relax. This process is discussed in greater detail below.

Extrusion is generally conventional (conventional refers to conventional for a dry-stretch process). The extruder may have a slot die (for flat precursor) or an annular die (for parison or bubble precursor). In the case of the latter, an inflated parison technique may be employed (e.g., a blow up ratio (BUR) of less than 1.5 as the precursor is extruded). However, the birefringence of the nonporous precursor does not have to be as high as in the conventional dry-stretch process. For example, in the conventional dry-stretch process to produce a membrane with a >35% porosity from a polypropylene resin with a melt flow index (MFI)<1.0, the birefringence of the precursor would be >0.0130; while with the instant process, the birefringence of the PP precursor could be as low as 0.0100. In another example, a membrane with a >35% porosity from a polyethylene resin, the birefringence of the precursor would be >0.0280; while with the instant process, the birefringence of the PE precursor could be as low as 0.0240.

Annealing (optional) may be carried out, in one embodiment, at temperatures between $T_m-80°$ C. and $T_m-10°$ C. (where $T_m$ is the melt temperature of the polymer); and in another embodiment, at temperatures between $T_m-50°$ C. and $T_m-15°$ C. Some materials, e.g., those with high crystallinity after extrusion, such as polybutene, may require no annealing. Additional optional steps may be carried out, for example but not limited to heat set, extraction, removal, winding, slitting, and/or the like.

Machine direction stretch may be conducted as a cold stretch or a hot stretch or both, and as a single step or multiple steps. In one embodiment, cold stretching may be carried out at $<T_m-50°$ C., and in another embodiment, at $<T_m-80°$ C. In one embodiment, hot stretching may be carried out at $<T_m-10°$ C. In one embodiment, total machine direction stretching may be in the range of 50-500%, and in another embodiment, in the range of 100-300%. During machine direction stretch, the precursor may shrink in the transverse direction (conventional).

Transverse direction stretching includes a simultaneous controlled machine direction relax. This means that as the precursor is stretched in the transverse direction (TD stretch) the precursor is simultaneously allowed to contract (i.e., relax), in a controlled manner, in the machine direction (MD relax). The transverse direction stretching may be conducted as a cold step, or a hot step, or a combination of both. In one embodiment, total transverse direction stretching may be in the range of 100-1200%, and in another embodiment, in the range of 200-900%. In one embodiment, the controlled machine direction relax may range from 5-80%, and in another embodiment, in the range of 15-65%. In one embodiment, transverse stretching may be carried out in multiple steps. During transverse direction stretching, the precursor may or may not be allowed to shrink in the machine direction. In an embodiment of a multi-step transverse direction stretching, the first transverse direction step may include a transverse stretch with the controlled machine direction relax, followed by simultaneous transverse and machine direction stretching, and followed by transverse direction relax and no machine direction stretch or relax.

Optionally, the precursor, after machine direction and transverse direction stretching may be subjected to a heat setting, as is well known.

The foregoing membrane and process embodiments are further illustrated in the following non-limiting examples.

EXAMPLES

Unless described otherwise, the test values reported herein, thickness, porosity, tensile strength, and aspect ratio, were determined as follows: thickness-ASTM-D374 using the Emveco Microgage 210-A micrometer; porosity-ASTM D-2873; tensile strength-ASTM D-882 using an Instron Model 4201; and aspect ratio-measurements taken from the SEM micrographs.

The following examples were produced by conventional dry-stretched techniques, except as noted.

Example 1. Polypropylene (PP) resin is extruded using a 2.5 inch extruder. The extruder melt temperature is 221° C. Polymer melt is fed to a circular die. The die temperature is set at 220° C., polymer melt is cooled by blowing air. Extruded precursor has a thickness of 27 micrometers (μm) and a birefringence of 0.0120. The extruded film was then annealed at 150° C. for 2 minutes. The annealed film is then cold stretched to 20% at room temperature, and then hot stretched to 228% and relaxed to 32% at 140° C. The machine direction (MD) stretched film has a thickness of 16.4 μm, and porosity of 25%. The MD stretched film is then transverse direction (TD) stretched 300% at 140° C. with MD relax of 50%. The finished film has a thickness of 14.1 μm, and porosity of 37%. TD tensile strength of finished film is 550 $Kg/cm^2$. See FIG. 6.

Example 2. Polypropylene (PP) resin is extruded using a 2.5 inch extruder. The extruder melt temperature is 220° C. Polymer melt is fed to a circular die. The die temperature is set at 200° C., polymer melt is cooled by blowing air. Extruded precursor has a thickness of 9.5 μm and a birefringence of 0.0160. HDPE resin is extruded using a 2.5 inch extruder. The extruder melt temperature is 210° C. Polymer melt is fed to a circular die. Die temperature is set at 205° C., polymer melt is cooled by air. Extruded precursor has a thickness of 9.5 μm and a birefringence of 0.0330. Two PP layers and one PE layers are laminated together to form a PP/PE/PP tri-layer film. Lamination roll temperature is 150° C. Laminated tri-layer film is then annealed at 125° C. for 2 minutes. The annealed film is then cold stretched to 20% at room temperature, and then hot stretched to 160% and relaxed to 35% at 113° C. The MD stretched film has a thickness of 25.4 μm, and porosity of 39%. The MD stretched film is then TD stretched 400% at 115° C. with MD relax of 30%. The finished film has a thickness of 19.4 μm and porosity of 63%. TD tensile strength of finished film is 350 $Kg/cm^2$. See FIG. 7.

Example 3. PP resin and HDPE resin are extruded using a co-extrusion die to form a PP/PE/PP tri-layer film. Extruder melt temperature for PP is 243° C., and extruder melt temperature for PE is 214° C. Polymer melt is then fed to a co-extrusion die which is set at 198° C. Polymer melt is cooled by blowing air. The extruded film has a thickness of 35.6 μm. The extruded precursor is then annealed at 125° C. for 2 minutes. The annealed film is then cold stretched to 45% at room temperature and hot stretched to 247% and relaxed to 42% at 113° C. The MD stretched film has a thickness of 21.5 μm and porosity of 29%. The MD stretched film is then TD stretched 450% at 115° C. with 50% MD relax. The finished film has a thickness of 16.3 μm and porosity of 59%. TD tensile strength of finished film is 570 $Kg/cm^2$.

Example 4. PP resin and HDPE resin are co-extruded and MD stretched the same way as in Example 3. The MD stretched film is then TD stretched 800% at 115° C. with 65% MD relax. The finished film has a thickness of 17.2 μm and porosity of 49%. TD tensile strength of finished film is 730 $Kg/cm^2$. See FIG. 8.

Example 5. PP resin and PB resin are extruded using a co-extrusion die. Extruder melt temperature for PP is 230° C., and extruder melt for PB is 206° C. Polymer melt is then fed to a co-extrusion die which is set at 210° C. Polymer melt is then cooled by blowing air. The extruded film has a thickness of 36.0 μm. The extruded precursor is then annealed at 105° C. for 2 minutes. The annealed film is then cold stretched to 20%, and then hot stretched at 105° C. to 155% and then relaxed to 35%. The MD stretched film is then TD stretched 140% at 110° C. with 20% MD relax. The finished film has a thickness of 14.8 μm and porosity of 42%. TD tensile strength of finished film is 286 $Kg/cm^2$.

Example 6. PP resin and PE resin are extruded using a co-extrusion die to form a PP/PE/PP trilayer film. Extruder melt temperature for PP is 245° C., and extruder melt temperature for PE is 230° C. Polymer melt is then fed to a co-extrusion die which is set at 225° C. Polymer melt is cooled by blowing air. The extruded film has a thickness of 27 μm and a birefringence of 0.0120. The extruded precursor is then annealed at 115° C. for 2 minutes. The annealed film is then cold stretched to 22% at room temperature and hot stretched to 254% and relaxed to 25% at 120° C. (total machine direction stretch=251%). The MD stretched film has a thickness of 15 μm and porosity of 16%. The MD stretched film is then TD stretched 260% at 130° C. with 50% MD relax, followed by a simultaneous MD and TD stretch of 50% and 216% in each direction at 130° C., and finally the film is held fast in the MD (100%) and allowed to relax 57.6% in the TD at a temperature of 130° C. The finished film has a thickness of 7.6 μm and porosity of 52%. TD tensile strength of finished film is 513 $Kg/cm^2$.

Example 7. Polypropylene and polyethylene resin(s) are extruded using a co-extrusion die to form a PP/PE/PP tri-layer film. Extruder melt temperature for PP is 222° C., and extruder melt temperature for PE is 225° C. Polymer melt is then fed to a co-extrusion die which is set at 215° C. Polymer melt is cooled by blowing air. The extruded film has a thickness of 40 μm and birefringence of 0.0110. The extruded precursor is then annealed at 105° C. for 2 minutes. The annealed film is then cold stretched to 36% at room temperature and hot stretched to 264% and relaxed to 29% at 109° C. (total machine direction stretch=271%). The MD stretched film has a thickness of 23.8 μm and porosity of 29.6%. The MD stretched film is then TD stretched 1034% at 110° C. with 75% MD relax. The finished film has a thickness of 16.8 μm and porosity of 46%. TD tensile strength of finished film is 1037 $Kg/cm^2$.

In the following Table I the results of the foregoing examples are summarized and compared to two commercially available dry-stretched membranes: Com A) CELGARD® 2400 (single ply polypropylene membrane), See FIG. 2; and Com B) CELGARD® 2300 (tri-layer polypropylene/polyethylene/polypropylene), see FIG. 3.

TABLE I

| | TD stretching | Thickness (μm) | Porosity | TD Tensile strength ($kg/cm^2$) | MD Tensile strength ($kg/cm^2$) | MD/TD tensile ratio | MD/TD Aspect ratio |
|---|---|---|---|---|---|---|---|
| Com A | N/A | 25.4 | 37% | 160 | 1700 | 10.6 | 6.10 |
| Com B | N/A | 25.1 | 40% | 146 | 1925 | 13.2 | 5.50 |
| Ex 1 | 300% | 14.1 | 37% | 550 | 1013 | 1.8 | 0.90 |
| Ex 2 | 400% | 19.4 | 63% | 350 | 627 | 1.8 | 0.71 |
| Ex 3 | 450% | 16.3 | 59% | 570 | 754 | 1.3 | — |
| Ex 4 | 800% | 17.2 | 49% | 730 | 646 | 0.9 | 0.83 |
| Ex 5 | 140% | 14.8 | 42% | 286 | 1080 | 3.8 | — |
| Ex 6 | 418% | 7.6 | 52% | 513 | 1437 | 2.8 | — |
| Ex 7 | 1034% | 16.8 | 46% | 1037 | 618 | 0.6 | — |

In accordance with at least selected embodiments of the membranes of the present invention:

Preferred JIS Gurley ≤2.5 to ~25 for monolayer PP air filtration membrane.

Preferred JIS Gurley ≤0.5 to ~5 for monolayer PP HEPA/ULPA membrane.

Preferred round pore structure and highly uniform pore structure across the membrane.

In accordance with at least selected possibly preferred embodiments of the present invention, the preferred membranes have or are:

Made by dry process, no oil/solvent is added.

High porosity: 40%-90%.

Balanced MD/TD strength: TD strength (>300 kg/cm2).

Low TD shrinkage:TD shrinkage at 90 C≤2%.

Preferred PP Polymer: MFI=0.1 to 10.0, polymer's crystallinity >45%.

Preferred PE polymer: MFI=0.01 to 5.0, crystallinity >50% MFI tested with ASTM D-1238 method.

Below are the testing results for eight membranes (A-G and M), composites or laminates in accordance with selected embodiments of the present invention and for a comparative sample Com C:

TABLE II

General Properties

| | | Sample ID | | | | | | | | |
|---|---|---|---|---|---|---|---|---|---|---|
| | | Com C | A | B | C | D | E | F | G | M |
| | | Sample Description | | | | | | | | |
| | Unit | PP Monolayer Comparative example | PP Monolayer | PP/PP Bonded Bi-layer | PP laminated with non-woven | PP/PE/PP coextruded trilayer | PP/PP Bonded Bi-layer | PP Monolayer | PP laminated with non-woven | PP/PE/PP coextruded trilayer |
| AVG Thickness, | μm | 25 | 18 | 20 | 79 | 21 | 24 | 14 | 77 | 22 |
| Porosity, | % | 55 | 73 | 65 | — | 76 | 80 | 81 | — | 60 |
| Puncture Strength | grams | 335 | 226 | 374 | 553 | 256 | 285 | 135 | 358 | 346 |
| MD Tensile | kgf/cm2 | 1055 | 754 | 938 | — | 500 | 533 | 507 | — | 862 |
| TD Tensile | kgf/cm2 | 135 | 493 | 711 | — | 450 | 491 | 461 | — | 473 |
| MD shrinkage at 90 C. | % | 5.0 | 6.1 | 5.0 | 1.21 | 13.8 | 6.0 | 6.5 | 2.29 | 5.5 |
| TD shrinkage at 90 C. | % | 0.0 | 0.4 | ~0.0 | 0.46 | 1.8 | ~0.0 | ~0.0 | 0.19 | 1.5 |
| AVG JIS Gurley, | Sec/100 cc | 200 | 32 | 60 | 85 | 35 | 26 | 14 | 45 | 65 |
| Mean flow pore diameter | μm | 0.0365 | 0.0543 | 0.0501 | 0.0468 | 0.0256 | 0.0610 | 0.0737 | 0.0542 | 0.250 |
| Stdev of mean flow pore diameter | | 0.0261 | 0.0183 | 0.0187 | 0.0181 | 0.0119 | 0.0190 | 0.0221 | 0.0183 | 0.110 |
| Bubble Point Diameter | μm | 0.1141 | 0.0948 | 0.0892 | 0.0736 | 0.0504 | 0.1078 | 0.1039 | 0.0808 | 0.049 |
| Hydrohead Pressure | psi | 155 | 149 | 159 | 277 | 364 | 222 | 153 | 206 | 377 |
| Water Intrusion Pressure | psi | >80 | >80 | >80 | >80 | >80 | >80 | >80 | >80 | >80 |
| WVTR | g/m2 · day | <6000 | 29300 | 178000 | 8560 | 29800 | >30000 | >30000 | 23000 | 16500 |

WVTR testing is based on ASTM F2298-03 using the moisture gradient method.

Highly hydrophobic.

Hydro-head pressure >140 psi, water intrusion pressure >80 psi.

Unique pore structure as characterized by capillary flow Porometry/Aquapore Test/SEM: mean flow pore diameter measured by capillary flow of at least about 0.04 micron; Uniform, round or non-slit type of pore structure, with narrow range of pore diameter. Aquapore size of at least about 0.07 micron High Gas/Air/moisture Permeability: JIS Gurley 1.0 to 100; high flow rate as characterized by capillary flow porometery; WVTR ≥8,000 $g/m^2$-day.

Test Methods for Water Vapor Diffusion Resistance and Air Flow Resistance of Clothing Materials Using the Dynamic Moisture Permeation Cell.

Testing condition: Top cell humidity 95%, bottom cell humidity 5%, Moisture gradient 90%. Ambient temperatures.

26Thickness was measured based on ASTM-D374 using Emveco Microgage 210A micrometer.

JIS Gurley is gas permeability test measured by using the OHKEN permeability tester. JIS Gurley is defined as the time in seconds required for 100 cc of air to pass through one square inch of film at constant pressure of 4.8 inches of water.

Porosity is measured by the method ASTM D2873.

Puncture Strength is measured using Instron Model 4442 based on ASTM D3763. The measurements were made across the width of the membrane and the averaged puncture energy (puncture strength) is defined as the force required to puncture the test sample.

Tensile properties are tested using ASTM-882 standard using an Instron Model 4201.

Shrinkage is measured at 90 C for 60 minutes using a modified ASTM-2732-96 procedure.

Mean flow pore diameter, bubble point pore diameter were measured with Capillary Flow analysis based on ASTM F316-86 standard.

Hydrohead pressure was measured based on ASTM D3393-91.

Water Intrusion was tested per ASTM F316-93 (Wetting fluid-water, 68.8 dynes/cm. Gas: air.)

Although not preferred, a filled, microporous ultra-high molecular weight polyethylene membrane could be used as a precursor in the stretching process of the present invention.

Also, the membrane of the present invention may be laminated on one or both sides to a non-woven substrate for additional durability, or it can be coated with a surfactant to make it hydrophilic.

In accordance with at least selected embodiments, the present invention may be directed to:

Biaxially stretching a blown film with simultaneous stretch and relax to produce a product useful in applications that require a high level of permeability to air, moisture vapor, and other gasses, but a high level of hydrophobicity. Such applications may include membrane-based humidity and temperature control systems such as liquid desiccant HVAC systems; membrane desalination; venting; fuel cell moisture control; liquid filtration; and the like.

In accordance with at least selected embodiments, the present invention may be directed to membranes having the following properties:

TABLE III

| Measurement | Units | Performance |
|---|---|---|
| Thickness | μm | 10-100 |
| JIS Gurley | sec (per 100 ml) | 1-100 |
| MD tensile strength | kgf/cm$^2$ | 500-1500 |
| TD tensile strength | kgf/cm$^2$ | 350-800 |
| Porosity | percent | 60-90% |
| Mean flow pore diameter | μm | 0.04-0.07 |
| Bubble point diameter | μm | 0.09-0.11 |
| Aquapore size | μm | 0.04-0.12 |
| Hydrohead pressure | psi | 149-222 |
| Intrusion pressure | Psi | >80 |
| Pressure drop | psid (at 5.3 cm/sec) | <3.90 |
| Particle efficiency | percent (at 2.5 cm/sec) | >99.99% |
| Melting point | ° C. | ≥165 |

In accordance with a possibly preferred embodiment of the present invention, the membrane is a hydrophobic, highly permeable, chemically and mechanically stable, high tensile strength membrane. These properties appear to make it an ideal film for the following applications, each of which (with the exception of air filtration) may involve the selective passage of moisture vapor and blockage of liquid water:

1. HVAC
2. Liquid-desiccant (LD) air conditioning
3. Water-based air conditioning
4. Energy recovery ventilation (ERV)
5. Desalination
6. RO Desalination
7. Steam Desalination
8. Fuel cells
9. Liquid and/or air filtration Particularly in the case of liquid and air filtration, the unique pore structure may have some specific benefits.

In accordance with at least selected embodiments, the preferred laminated products may have the combination of the desired membrane moisture transport performance combined with the desired macro physical properties.

In accordance with at least selected embodiments, the preferred monolayer PP products may have excellent balance of MD and TD physical properties while also being high performance membranes as measured by the moisture transport (moisture vapor transport) and hydrohead performance. The membrane may also have uncharacteristically high porosity (>60%) but still maintains the balanced physical properties when compared to more traditional membranes. Also, the membrane can be produced in union with a laminated PP nonwoven. The resultant laminated product may still retain the excellent moisture vapor transport and even more improved hydrohead performance. Also, the resultant product may have physical strength properties that far exceed comparative membranes. Therefore, the product may have the added advantage of being used in more physical abusive environments without a loss of the highly desirable membrane features.

In accordance with at least selected embodiments of the present invention, the membrane may have a unique pore structure and distribution or properties that may appear to make it an ideal film for the following applications:

- High efficiency air filtration,
- HEPA/ULPA applications,
- Near-zero emissions dust removal applications (clean-room, vacuum bag, facemask, surgical suites, dust bag, cartridge),
- Filtration applications:
  - high efficiency HVAC filter media
  - HEPA/ULPA media
  - filtration membrane composite
- Liquid Filtration,
- Protective Garments,
- Functional garments/Performance sports wear,
- Medical fabrics, and the like.

In accordance with at least selected porous material, film, layer, membrane, laminate, coextrusion, or composite embodiments of the present invention, some areas of improvement may include pore shapes other than slits, round shaped pores, increased transverse direction tensile strength, a balance of MD and TD physical properties, high performance related to, for example, moisture transport (or moisture vapor transport) and hydrohead pressure, reduced Gurley, high porosity with balanced physical properties, uniformity of pore structure including pore size and pore size distribution, enhanced durability, composites of such membranes with other porous materials, composites or laminates of such membranes, films or layers with porous nonwovens, coated membranes, coextruded membranes, laminated membranes, membranes having desired moisture transport, hydrohead performance, and physical strength properties, usefulness in more physically abusive environments without loss of desirable membrane features, combination of membrane moisture transport (or moisture vapor transport) performance combined with the macro physical properties, being hydrophobic, highly permeable, chemically and mechanically stable, having high tensile strength, combinations thereof, and/or the like.

While certain membranes made by the dry-stretch process have met with excellent commercial success, there is a need to improve, modify or enhance at least selected physical attributes thereof, so that they may be used in a wider spectrum of applications, perform better for particular purposes, and/or the like. In accordance with at least selected embodiments of dry-stretch process membranes of the present invention, some areas of improvement may include pore shapes other than slits, round shaped pores, increased transverse direction tensile strength, a balance of MD and TD physical properties, uniformity of pore structure including pore size and pore size distribution, high performance related to, for example, moisture transport (moisture vapor transport) and hydrohead pressure, reduced Gurley, high porosity with balanced physical properties, enhanced durability, composites of such membranes with other porous materials, composites or laminates of such membranes with porous nonwovens, coated membranes, coextruded membranes, laminated membranes, membranes having desired moisture transport (or moisture vapor transport), hydrohead performance, and physical strength properties, useful in more physically abusive environments without loss of desirable membrane features, combination of the membrane moisture transport (moisture vapor transport) performance combined with the macro physical properties, combinations thereof, and/or the like.

In accordance with at least selected possibly preferred embodiments, the porous membrane of the present invention is possibly preferably a dry-stretch process, porous membrane, film, layer, or composite that is hydrophobic, highly permeable, chemically and mechanically stable, has high tensile strength, and combinations thereof. These properties appear to make it an ideal membrane or film for the following applications, each of which (with the exception of air filtration) may involve the selective passage of moisture vapor (or other gases) and blockage of liquid water (or other liquids):

5. HVAC:
   a. Liquid-desiccant (LD) air conditioning (temperature and humidity control): In a membrane-based LD system, temperature and humidity may be controlled by a salt solution which absorbs or emits water vapor through a porous membrane. Heat is the motive force in the system (not pressure, as in most air conditioning systems). To make the system work, it may be necessary to have a hydrophobic membrane (to hold back the liquid) that readily passes water vapor.
   b. Water-based air conditioning (temperature and humidity control): Evaporative cooling systems or cooling water systems operate on a somewhat different principle than the LD systems, but would use the same essential properties of the membrane.
   c. Energy recovery ventilation (ERV): The simplest HVAC application uses the membrane as a key component of a heat and humidity exchange between make-up and exhaust air.
6. Desalination: Steam desalination applications use the same membrane properties as HVAC. Because the membrane holds back liquid salt water but passes water vapor, a system can be constructed which has salt water and fresh water separated by a membrane. With the salt water at a higher temperature, fresh water vapor emits from the salt water, migrates through the membrane, and condenses to form the fresh water stream.
7. Fuel cells: In a fuel cell, the proton exchange membrane (PEM) must stay continually humidified. This can be accomplished with the use of a membrane-based humidification unit.
8. Liquid and/or air filtration: In these embodiments, the porous membrane may act as a simple filter. As the liquid, vapor, gas, or air passes through the membrane, particles that are too large to pass through the pores are blocked at the membrane surface.

Particularly in the cases of liquid and air filtration, the unique pore structure of at least selected embodiments of the present invention may have certain specific benefits, such as the benefits of durability, high efficiency, narrow pore size distribution, and uniform flow rate.

In accordance with at least selected porous material or porous membrane embodiments of the present invention, at least a selected porous mono-layer polypropylene (monolayer PP) membrane has excellent balance of MD and TD physical properties while also being a high performance membrane as measured by the moisture transport and hydrohead performance. This selected monolayer PP membrane may also have high porosity (>60%) but still maintain the balanced physical properties when compared to more traditional membranes. Also, this selected monolayer PP membrane or film can be produced in union with or laminated to a porous polypropylene (PP) nonwoven material (nonwoven PP) on one or both sides thereof. The resultant composite, membrane or product (monolayer PP/nonwoven PP) or (nonwoven PP/monolayer PP/nonwoven PP) may preferably retain the excellent moisture transport and even more improved hydrohead performance. Also, this resultant composite product (monolayer PP/nonwoven PP) or (nonwoven PP/monolayer PP/nonwoven PP) may have physical strength properties that far exceed comparative membranes. Therefore, this new resultant composite product (monolayer PP/nonwoven PP) or (nonwoven PP/monolayer PP/nonwoven PP) may have the added advantage of being useful in more physically abusive environments without a loss of the highly desirable membrane features. It is believed that these selected monolayer PP membrane and composite products (monolayer PP; monolayer PP/nonwoven PP; or, nonwoven PP/monolayer PP/nonwoven PP) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like. While at least selected embodiments of the present invention may have, for example, desired porosity, moisture transport, hydrohead pressure, strength, and the like.

In accordance with at least selected porous material or porous membrane embodiments of the present invention, at least a selected porous multi-layer polypropylene (multilayer PP) membrane has excellent balance of MD and TD physical properties while also being a high performance membrane as measured by the moisture transport and hydrohead performance. This selected multilayer PP membrane may also have high porosity (>60%) but still maintain the balanced physical properties when compared to more traditional membranes. Also, this selected multilayer PP membrane or film can be produced in union with or laminated to a porous polypropylene (PP) nonwoven material (nonwoven PP) on one or both sides thereof. The resultant composite, membrane or product (multilayer PP/nonwoven PP) or (nonwoven PP/multilayer PP/nonwoven PP) may preferably retain the excellent moisture transport and even more improved hydrohead performance. Also, this resultant composite product (multilayer PP/nonwoven PP) or (nonwoven PP/multilayer PP/nonwoven PP) may have physical strength properties that far exceed comparative membranes. Therefore, this new resultant composite product (multilayer PP/nonwoven PP) or (nonwoven PP/multilayer PP/nonwoven PP) may have the added advantage of being useful in more physically abusive environments without a loss of the highly desirable membrane features. It is believed that these selected multilayer PP membrane and composite products (multilayer PP; multilayer PP/nonwoven PP; or, nonwoven PP/multilayer PP/nonwoven PP) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like. While at least selected embodiments of the present invention may have, for example, desired porosity, moisture transport, hydrohead pressure, strength, and the like.

In accordance with at least selected porous material or porous membrane embodiments of the present invention, at least a selected porous mono-layer polyethylene (monolayer PE) membrane has excellent balance of MD and TD physical properties while also being a high performance membrane as measured by the moisture transport and hydrohead performance. This selected monolayer PE membrane may also have high porosity (>60%) but still maintain the balanced physical properties when compared to more traditional membranes. Also, this selected monolayer PE membrane or film can be produced in union with or laminated to a porous polyethylene (PE) nonwoven material (nonwoven PE) or porous polypropylene (PP) nonwoven material (nonwoven PP) on one or both sides thereof. The resultant composite, membrane or product (monolayer PE/nonwoven PE) or (nonwoven PE/monolayer PE/nonwoven PE) may preferably retain the excellent moisture transport and even more improved hydrohead performance. Also, this resultant composite product (monolayer PE/nonwoven PE) or (nonwoven PE/monolayer PE/nonwoven PE) may have physical strength properties that far exceed comparative membranes. Therefore, this new resultant composite product (monolayer PE/nonwoven PE) or (nonwoven PE/monolayer PE/nonwoven PE) may have the added advantage of being useful in more physically abusive environments without a loss of the highly desirable membrane features. It is believed that these selected monolayer PE membrane and composite products (monolayer PE; monolayer PE/nonwoven PE; or, nonwoven PE/monolayer PE/nonwoven PE) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like. While at least selected embodiments of the present invention may have, for example, desired porosity, moisture transport, hydrohead pressure, strength, and the like.

In accordance with at least selected porous material or porous membrane embodiments of the present invention, at least a selected porous multi-layer polyethylene (multilayer PE) membrane has excellent balance of MD and TD physical properties while also being a high performance membrane as measured by the moisture transport and hydrohead performance. This selected multilayer PE membrane may also have high porosity (>60%) but still maintain the balanced physical properties when compared to more traditional membranes. Also, this selected multilayer PE membrane or film can be produced in union with or laminated to a porous polyethylene (PE) nonwoven material (nonwoven PE) or porous polypropylene (PP) nonwoven material (nonwoven PP) on one or both sides thereof. The resultant composite, membrane or product (multilayer PE/nonwoven PE) or (nonwoven PE/multilayer PE/nonwoven PE) may preferably retain the excellent moisture transport and even more improved hydrohead performance. Also, this resultant composite product (multilayer PE/nonwoven PE) or (nonwoven PE/multilayer PE/nonwoven PE) may have physical strength properties that far exceed comparative membranes. Therefore, this new resultant composite product (multilayer PE/nonwoven PE) or (nonwoven PE/multilayer PE/nonwoven PE) may have the added advantage of being useful in more physically abusive environments without a loss of the highly desirable membrane features. It is believed that these selected multilayer PE membrane and composite products (multilayer PE; multilayer PE/nonwoven PE; or, nonwoven PE/multilayer PE/nonwoven PE) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like. While at least selected embodiments of the present invention may have, for example, desired porosity, moisture transport, hydrohead pressure, strength, and the like.

In accordance with at least selected porous material or porous membrane embodiments of the present invention, at least a selected porous monolayer polymer membrane, for example, a monolayer (may have one or more plies) polyolefin (PO) membrane, such as a polypropylene (PP) and/or polyethylene (PE) (including PE, PP, or PE+PP blends) monolayer membrane, has excellent balance of MD and TD physical properties while also being a high performance membrane as measured by the moisture transport (or moisture vapor transport) and hydrohead performance. This selected monolayer PO membrane may also have high porosity (>60%) but still maintain the balanced physical properties when compared to more traditional membranes. Also, this selected monolayer PO membrane or film can be produced in union with or laminated to a porous nonwoven material, such as a nonwoven polymer material, for example, a PO nonwoven material (such as a porous polyethylene (PE) nonwoven material (nonwoven PE) and/or porous polypropylene (PP) nonwoven material (nonwoven PP) (including PE, PP, or PE+PP blends)) on one or both sides thereof. The resultant composite, membrane or product (monolayer PO/nonwoven PO) or (nonwoven PO/monolayer PO/nonwoven PO) may preferably retain the excellent moisture transport (or moisture vapor transport) and even more improved hydrohead performance. Also, this resultant composite product (monolayer PO/nonwoven PO) or (nonwoven PO/monolayer PO/nonwoven PO) may have physical strength properties that far exceed comparative membranes. Therefore, this new resultant composite product (monolayer PO/nonwoven PO) or (nonwoven PO/monolayer PO/nonwoven PO) may have the added advantage of being useful in more physically abusive environments without a loss of the highly desirable membrane features. It is believed that these selected monolayer PO membrane and composite products (monolayer PO; monolayer PO/nonwoven PO; or, nonwoven PO/monolayer PO/nonwoven PO) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, moisture vapor transport, hydrohead pressure, strength, and the like.

In accordance with at least selected porous material or porous membrane embodiments of the present invention, at least a selected porous multi-layer polymer membrane, for example, a multi-layer (two or more layer) polyolefin (PO) membrane, such as a polypropylene (PP) and/or polyethylene (PE) (including PE, PP, or PE+PP blends) multilayer membrane, has excellent balance of MD and TD physical properties while also being a high performance membrane as measured by the moisture transport (or moisture vapor transport) and hydrohead performance. This selected multilayer PO membrane may also have high porosity (>60%) but still maintain the balanced physical properties when compared to more traditional membranes. Also, this selected multilayer PO membrane or film can be produced in union with or laminated to a porous PO nonwoven material (such as a porous polyethylene (PE) nonwoven material (nonwoven PE) and/or porous polypropylene (PP) nonwoven material (nonwoven PP)) on one or both sides thereof. The resultant composite, membrane or product (multilayer PO/nonwoven PO) or (nonwoven PO/multilayer PO/nonwoven PO) may preferably retain the excellent moisture transport and even more improved hydrohead performance. Also, this resultant composite product (multilayer PO/nonwoven PO) or (nonwoven PO/multilayer PO/nonwoven PO) may have physical strength properties that far exceed comparative membranes. Therefore, this new resultant composite product (multilayer PO/nonwoven PO) or (nonwoven PO/multilayer PO/nonwoven PO) may have the added advantage of being useful in more physically abusive environments without a loss of the highly desirable membrane features. It is believed that these selected multilayer PO membrane and composite products (multilayer PO; multilayer PO/nonwoven PO; or, nonwoven PO/multilayer PO/nonwoven PO) are unique in their combination of membrane moisture transport performance combined with their macro physical properties. For example, prior membranes may have had porosity but not sufficient hydrohead pressure or performance, other membranes were too fragile, other membranes were strong but lacked other properties, or the like, while at least selected embodiments of the present invention may have, for example, desired porosity, moisture transport, hydrohead pressure, strength, and the like.

In accordance with at least selected porous material or porous membrane embodiments of the present invention, the pores (openings) have the following pore aspect ratios (based on physical dimensions of the pore opening in the machine direction (MD) (length), and transverse machine direction (TD)(width) by measuring, for example, one or more of the pores (preferably several of the pores to ascertain an average) in SEMs of the surface, top or front (A side) of selected membranes or composites, for example, mono-layer, bi-layer or tri-layer membranes:

Typical:

MD/TD aspect ratio in range of 0.75 to 1.50

Preferred:

MD/TD aspect ratio in range of 0.75 to 1.25

Most Preferred:

MD/TD aspect ratio in range of 0.85 to 1.25

In accordance with at least selected porous material or porous membrane embodiments of the present invention, if the MD/TD pore aspect ratio were 1.0, then a three-dimensional or 3D pore sphericity factor or ratio (MD/TD/ND) range could be: 1.0 to 8.0 or more; possibly preferred 1.0 to 2.5; and, most possibly preferred 1.0 to 2.0 or less (based on physical dimensions of the pore openings in the machine direction (MD) (length), transverse machine direction (TD) (width) and thickness direction or cross section (ND)(thickness); for example, measuring the MD and TD of one or more pores (preferably several pores to ascertain an average) in SEMs of the surface, top or front (A side), or the surface, bottom or back (B side), and measuring the ND of one or more pores (preferably several pores to ascertain an average) in SEMs of the cross-section, depth, or height (C side)(either length or width cross-section or both)(the ND dimension may be of a different pore than the MD and TD dimension as it may be difficult to measure the ND, MD and TD dimension of the same pore).

In accordance with at least selected porous material or porous membrane embodiments of the present invention, the three-dimensional or 3D MD/TD/ND pore sphericity factor or ratio range could be: 0.25 to 8.0 or more; possibly preferred 0.50 to 4.0; and, most possibly preferred 1.0 to 2.0 or less.

In accordance with at least selected porous material or porous membrane embodiments of the present invention, the pores (openings) have the following pore aspect ratios (based on physical dimensions of the pore opening in the machine direction (MD) (length), and transverse machine direction (TD)(width) based on measuring the pores in SEMs of the top or front (A side) of selected mono-layer and tri-layer membranes:

Here are the typical numbers for aspect ratio range of Machine direction MD (length) and Transverse direction TD (width):

MD/TD aspect ratio in range of 0.75 to 1.50

In accordance with at least selected porous material or porous membrane embodiments of the present invention, the pores (openings) have the following three dimensional or 3D pore sphericity factors or ratios (based on physical dimensions of the pore openings in the machine direction (MD) (length), transverse machine direction (TD)(width) and thickness direction or cross section (ND) (thickness); for example, measuring one or more pores (preferably several pores to ascertain an average) in SEMs of the surface, top or front (A side), the surface, bottom or back (B side), and the cross-section, depth, or height (C side)(either length or width cross-section or both) (the ND dimension may be of a different pore than the MD and TD dimension as it may be difficult to measure the ND, MD and TD dimension of the same pore) of selected membranes, layers or composites, for example, of selected mono-layer and tri-layer membranes:

For example:

Typical:

MD/TD aspect ratio in range of 0.75 to 1.50
MD/ND dimension ratio in range of 0.50 to 7.50
TD/ND dimension ratio in range of 0.50 to 5.00

Preferred:

MD/TD aspect ratio in range of 0.75 to 1.25
MD/ND dimension ratio in range of 1.0 to 2.5
TD/ND dimension ratio in range of 1.0 to 2.5

Most Preferred:

MD/TD aspect ratio in range of 0.85 to 1.25
MD/ND dimension ratio in range of 1.0 to 2.0
TD/ND dimension ratio in range of 1.0 to 2.0

In accordance with at least selected porous material or porous membrane embodiments of the present invention, the pores (openings) have the following pore sphericity factors or ratios (based on physical dimensions of the pore opening in the machine direction (MD)(length), transverse machine direction (TD)(width) and thickness direction or cross section (ND)(thickness) based on measuring the pores in SEMs of the top or front (A side) and the length and with cross-sections (C side) of selected mono-layer and tri-layer membranes:

Here are the typical numbers for sphericity factor or ratio range of Machine direction MD (length), Transverse direction TD (width), and Thickness direction ND (vertical height):

MD/TD aspect ratio in range of 0.75 to 1.50
MD/ND dimension ratio in range of 0.50 to 7.50
TD/ND dimension ratio in range of 0.50 to 5.00

In accordance with at least selected embodiments of the present invention, a microporous membrane is made by a dry-stretch process and has substantially round shaped pores and a ratio of machine direction tensile strength to transverse direction tensile strength in the range of 0.5 to 6.0, preferably 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax.

In accordance with at least selected embodiments of the present invention, a porous membrane is made by a modified dry-stretch process and has substantially round shaped pores, a ratio of machine direction tensile strength to transverse direction tensile strength in the range of 0.5 to 6.0, and has low Gurley as compared to prior dry-stretch membranes, has larger and more uniform mean flow pore diameters as compared to prior dry-stretch membranes, or both low Gurley and larger and more uniform mean flow pore diameters.

While membranes made by the conventional dry-stretch process have met with excellent commercial success, in accordance with at least selected embodiments of the present invention, there is provided improved, modified or enhanced at least selected physical attributes thereof, so that they may be used in a wider spectrum of applications, may perform better for particular purposes, and/or the like.

While at least certain air filters have met with commercial success, in accordance with at least selected embodiments of the present invention, there is provided improved, modified or enhanced filtration media so that they may be used in a wider spectrum of filtration or separation applications, may perform better for particular purposes, and/or the like.

While certain such flat sheet porous materials for filtration or separation processes have met with commercial success, in accordance with at least selected embodiments of the present invention, there is provided improved, modified or enhanced porous materials so that they may be used in a wider spectrum of applications, may perform better for particular purposes, and/or the like.

While porous materials for the selective passage of gases or humidity (moisture vapor) and blockage of liquid water or salt water may have met with commercial success, such as RO membranes sold by Dow Chemical, ePTFE membranes sold by W.L. Gore, BHA, and others, in accordance with at least selected embodiments of the present invention, there is provided improved, modified or enhanced porous materials so that they may be used in a wider spectrum of applications, may perform better for particular purposes, and/or the like.

In accordance with at least selected embodiments of the present invention, an air-filter includes at least one porous membrane such as a microporous membrane.

In accordance with at least selected embodiments of the present invention, a microporous membrane is made by a dry-stretch process and has substantially round shaped pores and a ratio of machine direction tensile strength to transverse direction tensile strength in the range of 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax.

In accordance with at least selected embodiments of the present invention, a porous membrane is made by a modified dry-stretch process and has substantially round shaped pores, a ratio of machine direction tensile strength to transverse direction tensile strength in the range of 0.5 to 6.0, and has low Gurley as compared to prior dry-stretch membranes, has larger and more uniform mean flow pore diameters as compared to prior dry-stretch membranes, or both low Gurley and larger and more uniform mean flow pore diameters.

An air-filter cartridge according to the instant invention may include at least one pleated microporous membrane, a plurality of microporous membranes, and it may further include end-plates, spacers, or the like.

An air-filter cartridge, as used herein, refers to a cartridge that may either be used in an air-filter or an air-purifier. The instant application describes the instant invention in terms of an air-filter cartridge; however, the instant invention is not limited so, and it may include air-purifier cartridges as well. Also, the membrane may be pleated to provide a large filtration area in a relatively small volume. In the alternative, the membrane may have a sinusoidal pattern to provide a large filtration area in a relatively small volume.

Further, the membrane may have any configuration; for example, it may have a configuration selected from the group consisting of pleated cylinder configuration, pleated flat sheet configuration, and spiral wound configuration.

In an example manufacturing process, at least one flat sheet microporous membrane is constructed and then, the membrane is folded into a pleated or an accordion folded shape thereby increasing the filtration area. Subsequently, the pleated membrane may be wound into a cylinder, and sealed via end-plates thereby forming an air-filter cartridge. The air-filter cartridge may be inserted into a housing, and sealed via end caps.

In accordance with at least selected embodiments, which may be well suited as battery separators, the possibly preferred membrane is preferably made of one or more polyolefins and may be further characterized by one or more of the following parameters: thickness, porosity, average pore size, puncture strength, JIS Gurley Number, and shutdown temperature.

The thickness of the membrane may be less than 6.0 mils (150 microns). In another embodiment, the thickness may range from 10 microns to 150 microns. In yet another embodiment, the thickness may range from 10 microns to 50 microns.

The porosity of the membrane may be between 40 and 90%. In one embodiment, porosity ranges from 60-90%. In yet another embodiment, porosity ranges from 65-80%.

The average Aquapore size of the membrane may be between 0.04-0.20 microns. In one embodiment, the average pore size ranges from 0.04-0.120 microns. In yet another embodiment, the average pore size ranges from 0.07-0.12 microns.

The puncture strength may be greater than or equal to 300 gr-force/mil. Puncture strength is determined by averaging 10 measurements across the width of the final product using a Midtech Stevens LFRA texture analyzer and a needle with a 1.65 mm diameter and a 0.5 mm radius recording data at a rate of 2 mm/sec with a maximum amount of deflection of 6 mm.

The JIS Gurley Number (normalized to one mil thickness) may be less than 100 sec/100 cc/mil thickness. In one embodiment, the JIS Gurley number ranges from 12 to 80 sec/10 cc/mil.

In accordance with certain embodiments, the intrinsic viscosity (IV) of the membrane may be greater than or equal to 1.0 dl/g. In another embodiment, the IV may be greater than or equal to 5.0 dl/g. In another embodiment, the IV may preferably be greater than or equal to 3.0 dl/g. The IV of the film is not the weighted average of the pre-extruded resins composing the membrane because during extrusion the polymers undergo chain scission and the molecular weight is thereby lowered. Intrinsic viscosity, as used herein, refers to the measure of the capability of a polymer in solution to enhance the viscosity of the solution. The intrinsic viscosity number is defined as the limiting value of the specific viscosity/concentration ratio at zero concentration. Thus, it becomes necessary to find the viscosity at different concentrations, and then extrapolate to zero concentration. The variation of the viscosity number with concentration depends on the type of molecule as well as the solvent. In general, the intrinsic viscosity of linear macromolecular substances is related to the weight average molecular weight or degree of polymerization. With linear macromolecules, viscosity number measurements can provide a method for the rapid determination of molecular weight when the relationship between viscosity and molecular weight has been established. IV is measured by first dissolving 0.02 g of the membrane in 100 ml of decalin at 150° C. for one hour, and then, determining its intrinsic viscosity at 135° C. via an Ubbelohd viscometer. This is according to ASTM D4020 (RSV values reported herein).

The shutdown temperature may be less than 260° C. (260 degrees Centigrade or Celsius). In one embodiment, the shutdown temperature may be less than 190° C. In yet another embodiment, the shutdown temperature may be less than 140° C. In still another embodiment, the shutdown temperature may be less than 130° C. In yet still another embodiment, the shutdown temperature may be less than 120° C.

The membrane of the present invention may be made of a single polymer or a blend of polymers or of layers of the same or different polymers or of layers of different materials bonded, laminated or coextruded together. The possibly preferred polymers are polyolefins, such as polypropylene (PP) and/or polyethylene (PE). For example, the membrane may be made of one or more layers of PP and/or PE. In one particular example, the membrane is a porous PP film or sheet. In another particular example, the membrane is a porous PE film or sheet. In yet another particular example, the membrane is a tri-layer membrane made of two exterior PP layers and an intermediate or center PE layer. In another particular example, the membrane is a bi-layer membrane made of two PP layers, two PE layers, or one PP and one PE layer bonded together, laminated together, or coextruded together. In still yet another particular example, the membrane is a composite of a porous PP film or sheet and a porous material such as nonwoven glass or PP material. In still another particular example, the membrane is a porous film or sheet made of a blend of polyolefins having differing molecular weights.

In accordance with at least selected embodiments, a gas filtration media comprises a microporous membrane. A gas filtration media, as used herein refers to a filtration media for removal of particulates from a gas, e.g., air.

The gas filter media of the present invention may include an ultrahigh molecular weight polyethylene and an inorganic material. The gas filter media may further include a processing oil (i.e., oil remains in the media after extraction). The gas filter media may further include a thermoplastic polyolefin, conventional additives, such as stabilizers and antioxidants, and the like as is well known in the art.

The gas filter media may be used as a filter media for any end-use applications. For example, the gas filter media may be used as a filter media for an end-use application selected from the group consisting of particulate removal from gases, air-filtration application, elevated temperature application, baghouse application, particulate filtration in food and pharmaceuticals, particulate filtration in combustion process, particulate filtration in metals, and particulate filtration in cements. Particulate removal from gases includes industries such as HVAC, HEPA and ULPA clean rooms, vacuum cleaning, respirators, cement, metals, food, pharmaceuticals, processed fluids, and combustion processes.

The gas filter media may stand alone as a filter media; or in the alternative, it may be joined with (e.g., laminated to or bonded to) a support material, for example, a non-woven material or a fabric. Exemplary lamination or bonding techniques include such conventional methods as, but not limited to, adhesives, welding (heat/ultrasonics) and the like. Furthermore, the gas filter media may be flat or formed into pleats or shapes.

There is a need to have a more dimensionally stable (or high temperature melt integrity) separator for larger cells, because if short-circuiting occurs, the rupture of the cell could be more significant because of the greater mass of lithium material contained in the larger cell. Thus, in accordance with at least certain embodiments, a battery separator is made from a nonwoven flat sheet material having high temperature melt integrity, a microporous membrane having low temperature shutdown properties, and an optional adhesive bonding the nonwoven flat sheet to the microporous membrane and being adapted for swelling when contacted by an electrolyte.

The high temperature melt integrity separator may comprise a microporous membrane and a nonwoven flat sheet that are bonded together with or without an adhesive or polymer therebetween. Nonwoven flat sheet may refer to a plurality of fibers held together by various methods, e.g., thermal fusion, resin, solvent bonding, or mechanical interlocking of fibers, sometimes concurrently with their extrusion. Nonwoven flat sheet includes fibrous structures made by such processes as dry, wet, or air laying, needlepunching, spunbonding, or melt blowing processes, and hydroentanglement. The fibers may be directionally or randomly oriented. While nonwoven typically does not include paper, for this application, papers are included. The fibers may be made of thermoplastic polymers, cellulosic, and/or ceramics. Thermoplastic polymers include, but are not limited to, polystyrenes, polyvinyl chlorides, polyacrylics, polyacetals, polyamides, polycarbonates, polyesters, polyetherimides, polyimides, polyketones, polyphenylene ethers, polyphenylene sulfides, polysulfones. Cellulosics include, but are not limited to, cellulose (e.g., cotton or other naturally occurring sources), regenerated cellulose (e.g., rayon), and cellulose acetate (e.g., cellulose acetate and cellulose triacetate). Ceramics include, but are not limited to, glass of all types and alumina, silica, and zirconia compounds (e.g., aluminum silicate).

Additionally, the nonwoven or the fibers of the nonwoven may be coated or surface treated to improve the functionality of the nonwoven. For example, the coating or surface treatment may be to improve the adhesiveness of the nonwoven or its fibers, to improve the high temperature melt integrity of the nonwoven, and/or to improve the wettability of the nonwoven. With regard to improving the high temperature melt integrity, the nonwoven and/or its fibers may be coated or surface treated with a ceramic material. Such ceramic materials include, but are not limited to, alumina, silica, and zirconia compounds, and combinations thereof.

In accordance with at least selected embodiments, bonding of the microporous membrane to the nonwoven flat sheet should maintain a high discharge rate which may require that there will be free mobility of the ionic species of the electrolyte between the anode and the cathode. The mobility of the ionic species is typically measured as electrical resistance (ER) or MacMullen number (the ratio of electrical resistance of an electrolyte-saturated porous medium to the electrical resistance of an equivalent volume of electrolyte [See: U.S. Pat. No. 4,464,238, incorporated herein by reference]). Accordingly, there may be a need for adhering the sheet to the membrane with a material that does not decrease ion mobility (or increase the electrical resistance) across the separator.

The adhesive may be selected from, but is not limited to, polyvinylidene fluoride (PVDF); polyurethane; polyethylene oxide (PEO); polyacrylonitrile (PAN); polymethylacrylate (PMA); poly(methylmethacrylate) (PMMA); polyacrylamide; polyvinyl acetate; polyvinylpyrrolidone; polytetraethylene glycol diacrylate; copolymers of any the foregoing and combinations thereof. One criterion for comonomer selection is the comonomer's ability to modify the surface energy of the homopolymer. Surface energy impacts, at least: the solubility of the copolymer, thereby affecting coating the copolymer onto the membrane; the adhesion of the copolymer to the membrane, thereby affecting battery manufacture and subsequent performance; and the wettability of the coating, thereby affecting absorption of liquid electrolyte into the separator. Suitable comonomers include, but are not limited to, hexafluoropropylene, octofluoro-1-butene, octofluoroisobutene, and tetrafluoroethylene. The comonomer content preferably ranges from 3 to 20% by weight, and most preferably, 7 to 15%. Preferably, the adhesive or swellable polymer is a copolymer of polyvinylidene fluoride. Preferably, the PVDF copolymer is a copolymer of polyvinylidene fluoride and hexafluoropropylene (PVDF:HFP), and, most preferably, the PVDF:HFP ratio is 91:9. The PVDF copolymers are commercially available from Elf Atochem, Philadelphia, Pa., USA; Solvay SA, Brussels, Belgium; and Kureha Chemical Industries, LTD, Ibaraki, Japan. A preferred PVDF:HFP copolymer is KYNAR 2800 from Elf Atochem.

The wetting agent may be selected from materials that are compatible with (i.e., miscible with or will not phase separate from) the swellable polymer, that, in trace amounts (e.g., 10 20% of the swellable polymer), will not have a detrimental effect upon the battery chemistry (such as wetting agents that contain sulfones, sulphates, and nitrogen), and that are fluid at room temperature or have a Tg (glass transition temperature) <50° C. The wetting agent may be selected from, but is not limited to, phthalate-based esters, cyclic carbonates, polymeric carbonates, and mixtures thereof. Phthalate-based esters are selected from, but are not limited to, dibutyl phthalate (DBP). Cyclic carbonates are selected from ethylene carbonate (EC), propylene carbonate (PC), butylene carbonate (BC), and mixtures thereof. Polymeric carbonates are selected from, but are not limited to; polyvinylene carbonate, and linear propylene carbonates.

At least selected embodiments of the present invention may provide a microporous battery separator having two portions bonded together. Each portion may consist of a co-extruded or non-coextruded layer and may be made of the same or different materials. To obtain greater puncture strength, certain embodiments may bond together two portions that are sized, when combined, to have the desired total thickness of the separator. Selected embodiments may, preferably, be made by a collapsed bubble technique; i.e. a blown film technique in which a single molten polymer (or blend of polymers) is extruded through an annular die, the bubble which issues from the die has a first portion and a second portion (each portion representing roughly one-half of the circumference of the bubble), and then the bubble is collapsed onto itself and bonded prior to micropore formation (preferably by annealing and stretching). When the bubble issues from the die, it is substantially oriented in the machine direction. Thus, when the bubble is collapsed onto itself and bonded, the first portion and the second portion may be oriented in substantially the same direction (angular bias between oriented portions being less than 15°). Collapsing and bonding are performed in the same step by allowing the molten (or near molten) polymer of the bubble to knit together. By collapsing the bubble onto itself and bonding same, increased puncture strength is obtained at thicknesses which may be equivalent to other separators. The first portion and the second portion, which when bonded provide the precursor for the micropore formation process (e.g. an anneal and stretch operation), may be made of materials such as polyolefins, preferably polyethylene or polypropylene, copolymers thereof, and mixtures thereof, and most preferably polyethylene and polypropylene.

A trilayer, shutdown battery separator may refer to a porous film for use in electrochemical cells, e.g., batteries, particularly secondary (or rechargeable) batteries, such as lithium batteries. This trilayer separator may have a polypropylene-polyethylene-polypropylene construction. The separator may have a thickness of less than 3 mils (about 75 microns). The separator's thickness preferably ranges between 0.5 mils (about 12 microns) and 1.5 mils (about 38 microns). Most preferably, the separator's thickness is about 1 mil (about 25 microns). Preferably, the separator has a permeability, as measured by JIS Gurley, of less than 300 sec. Preferably, the separator has a puncture strength of at least 300 grams. Preferably, the separator has porosity in the range of 40% to 70%.

One method of making the trilayer, shutdown battery separator generally comprises the steps of: extruding non-porous polypropylene precursors; extruding a non-porous polyethylene precursor; forming a non-porous trilayer precursor where the polyethylene precursor is sandwiched between the polypropylene precursors; bonding the trilayer precursor; annealing the trilayer precursor; and stretching the bonded and annealed, non-porous trilayer precursor to form the porous battery separator.

In at least one embodiment, the membrane may be a microporous sheet made from a blend of at least two ultra high molecular weight polyolefins having differing molecular weights. In one embodiment, these ultra high molecular weight polyolefins may be ultra high molecular weight polyethylene (UHMWPE). In another embodiment, the membrane is a blend of a first ultra high molecular weight polyethylene having a first molecular weight and a second ultra high molecular weight polyethylene having a second molecular weight, the first molecular weight and the second molecular weight being greater than 1 million and being different from one another. In another embodiment, the membrane is a blend of a first ultra high molecular weight polyethylene having a first molecular weight, a second ultra high molecular weight polyethylene having a second molecular weight, the first molecular weight and the second molecular weight being greater than 1 million and being different from one another, and a third polyolefin having a third molecular weight, the third molecular weight being less than 1 million. In yet another embodiment, the membrane may have an IV greater than or equal to 6.3 dl/g. In another embodiment, the membrane may have an IV greater than or equal to 7.7 dl/g.

In at least selected embodiments, the invention is directed to biaxially oriented porous membranes, composites including biaxially oriented porous membranes, biaxially oriented microporous membranes, biaxially oriented macroporous membranes, battery separators, filtration media, humidity control media, flat sheet membranes, liquid retention media, and the like, related methods, methods of manufacture, methods of use, and the like.

In accordance with at least selected embodiments, a laminated material or fabric may incorporate a composite membrane made according to the present invention and that is wind and liquid penetration resistant, moisture vapor transmissive and air permeable. The laminated fabric may also include one or more layers of textile base or shell fabric material that are laminated to the membrane by any suitable process. The shell fabric may be made from any suitable material that meets performance and other criteria established for a given application.

"Moisture vapor transmissive" is used to describe an article that permits the passage of water vapor through the article, such as the laminated fabric or composite membrane. The term "resistant to liquid penetration" is used to describe an article that is not "wet" or "wet out" by a challenge liquid, such as water, and prevents the penetration of liquid through the membrane under ambient conditions of relatively low pressure. The term "resistant to wind penetration" describes the ability of an article to prevent air penetration above more than about three (3) CFM per square foot at a pressure differential across the article of 0.5" of water.

By way of example, jackets, coats, or other garments or finished products incorporating the laminated fabric may permit moisture vapor transmission through the garment. Moisture vapor may result from perspiration of the user, and the garment or finished product preferably permits moisture vapor transmission at a rate sufficient for the user to remain dry and comfortable during use in typical conditions. The laminated fabric is also preferably resistant to liquid and wind penetration, while being air permeable.

In accordance with at least selected embodiments of the present invention, an air-filter cartridge includes at least one pleated microporous membrane.

At least a selected microporous membrane is made by a dry-stretch process and has substantially round shaped pores and a ratio of machine direction tensile strength to transverse direction tensile strength in the range of 0.5 to 6.0. The method of making the foregoing microporous membrane may include the steps of: extruding a polymer into a nonporous precursor, and biaxially stretching the nonporous precursor, the biaxial stretching including a machine direction stretching and a transverse direction stretching, the transverse direction including a simultaneous controlled machine direction relax.

At least selected embodiments of the invention may be directed to biaxially oriented porous membranes, composites including biaxially oriented porous membranes, biaxially oriented microporous membranes, biaxially oriented macroporous membranes, battery separators, filtration media, humidity control media, flat sheet membranes, liquid retention media, and the like, related methods, methods of manufacture, methods of use, and the like.

In accordance with at least selected embodiments of the present invention, there is provided at least one of:

A membrane comprising:

at least one layer of porous polymer film made by a dry-stretch process including the steps of:

extruding a polymer into at least a single layer nonporous precursor, and biaxially stretching the nonporous precursor, the biaxial stretching including a machine direction stretching and a transverse direction stretching, the transverse direction stretching including a simultaneous controlled machine direction relax, and having substantially round shaped pores, a porosity of about 40% to 90%, a ratio of machine direction tensile strength to transverse direction tensile strength in the range of about 0.5 to 5.0, a Gurley of less than about 100, a mean flow pore diameter of at least about 0.04 microns, an Aquapore size of at least about 0.07 microns, and a hydrohead pressure greater than about 140 psi.

The above membrane, wherein the machine direction stretching of said biaxially stretching includes the step of transverse direction stretching with simultaneous machine direction stretching, and wherein said biaxially stretching further includes the step of transverse direction relax.

The above membrane, wherein said biaxially stretching of said nonporous precursor further includes an additional step of machine direction stretching.

The above membrane, wherein said dry-stretch process further includes the step of:

machine direction stretching to form a porous intermediate prior to said biaxial stretching.

The above membrane, wherein said biaxially stretching of said nonporous precursor includes the machine direction stretching, an additional transverse direction stretching with simultaneous machine direction stretching, and a transverse direction relax.

The above membrane, wherein said dry-stretch process includes the steps of:

machine direction stretching followed by said biaxial stretching including said transverse direction stretching with simultaneous controlled machine direction relax, a second transverse direction stretching with simultaneous machine direction stretching, followed by transverse direction relax.

The above membrane, with said porous polymer film further having a thickness of at least about 8 microns, a transverse direction tensile strength of at least about 300 kgf/cm2, a standard deviation of mean flow pore diameter of less than about 0.025, a water intrusion pressure of at least about 80 psi, and a WVTR of at least about 8,000 g/m$^2$-day.

The above membrane, with said porous polymer film further having a transverse direction shrinkage of less than about 1.0% at 90° C.

The above membrane, with said porous polymer film further having a transverse direction shrinkage of less than about 1.5% at 105° C.

The above membrane, with said porous polymer film further having a transverse direction shrinkage of less than about 3.0% at 120° C.

The above membrane, with said porous polymer film further having a machine direction shrinkage of less than about 10% at 90° C.

The above membrane, with said porous polymer film further having a machine direction shrinkage of less than about 20% at 105° C.

The above membrane, with said porous polymer film further having a machine direction shrinkage of less than about 30% at 120° C.

The above membrane, with said porous polymer film further having a thickness in a range of about 8 microns to 80 microns.

The above membrane, wherein said nonporous precursor is one of a blown film and a slot die film.

The above membrane, wherein said nonporous precursor is a single layer precursor formed by at least one of single layer extrusion and multilayer extrusion.

The above membrane, wherein said nonporous precursor is a multilayer precursor formed by at least one of coextrusion and lamination.

The above membrane, wherein said porous polymer film comprises one of polypropylene, polyethylene, blends thereof, and combinations thereof.

The above membrane, wherein said porous polymer film uses polyolefin resins which have a melt flow index (MFI) of about 0.01 to 10.0 and a polymer crystallinity of at least about 45%.

The above membrane, wherein said precursor is one of a single layer precursor and a multilayer precursor.

The above membrane, wherein said membrane further includes at least one nonwoven, woven, or knit layer bonded to at least one side of said porous polymer film.

The above membrane, wherein said membrane is made up of a plurality of said porous polymer films.

The above membrane, wherein said porous polymer film is made up of at least two layers.

The above membrane, wherein said membrane has substantially round shaped pores, a porosity of about 40% to 90%, a ratio of machine direction tensile strength to transverse direction tensile strength in the range of about 0.5 to 5.0, a Gurley of less than about 100, a mean flow pore diameter of at least about 0.04 microns, an Aquapore size of at least about 0.07 microns, and a hydro-head pressure greater than about 140 psi.

The above membrane, wherein said polymer being a semi-crystalline polymer.

The above membrane, wherein said polymer being selected from the group consisting of polyolefins, fluorocarbons, polyamides, polyesters, polyacetals (or polyoxymethylenes), polysulfides, polyphenyl sulfide, polyvinyl alcohols, co-polymers thereof, blends thereof, and combinations thereof.

The above membrane, with said porous polymer film further having a porosity of about 65% to 90%, a ratio of machine direction tensile strength to transverse direction tensile strength in the range of about 1.0 to 5.0, a Gurley of less than about 20, a mean flow pore diameter of at least about 0.05 microns, an Aquapore size of at least about 0.08 microns, and a hydro-head pressure greater than about 145 psi.

The above membrane, wherein said substantially round shaped pores have at least one of an aspect ratio in the range of about 0.75 to 1.25 and a sphericity factor in the range of about 0.25 to 8.0.

At least one of a filtration membrane, a humidity control membrane, a gas and/or liquid separation membrane, a selective passage of humidity and blockage of liquid water membrane, and a multi-layered membrane structure comprising the above membrane.

The above membrane, wherein said biaxially stretching step of said dry-stretch process includes the simultaneous biaxial stretching of a plurality of separate, superimposed, layers or plies of nonporous precursor, wherein none of the plies are bonded together during the stretching process.

The above membrane, wherein said biaxially stretching step of said dry-stretch process includes the simultaneous biaxial stretching of at least three separate, superimposed, layers of nonporous precursor.

The above membrane, wherein said biaxially stretching step of said dry-stretch process includes the simultaneous biaxial stretching of at least eight separate, superimposed, layers of nonporous precursor.

The above membrane, wherein said biaxially stretching step of said dry-stretch process includes the simultaneous biaxial stretching of at least sixteen separate, superimposed, layers of nonporous precursor.

The above membrane, wherein said biaxially stretching step of said dry-stretch process includes the simultaneous biaxial stretching of a plurality of bonded, superimposed, layers or plies of nonporous precursor, wherein all of the plies are bonded together during the stretching process.

The above membrane, wherein said biaxially stretching step of said dry-stretch process includes the simultaneous biaxial stretching of a plurality of separate, superimposed, layers or plies of nonporous precursor, and a plurality of bonded, superimposed, layers or plies of nonporous precursor, wherein some of the plies are bonded together during the stretching process.

The above membrane, wherein said extruding step is a dry extrusion process, using an extruder having at least one of a slot die and an annular die.

A battery separator comprising:

at least one layer of porous polymer film made by a dry-stretch process including the steps of:

extruding a polymer into at least a single layer nonporous precursor, and biaxially stretching the nonporous precursor, the biaxial stretching including a machine direction stretching and a transverse direction stretching, the transverse direction stretching including a simultaneous controlled machine direction relax, and having substantially round shaped pores, a porosity of about 40% to 70%, a ratio of machine direction tensile strength to transverse direction tensile strength in the range of about 0.5 to 5.0, a Gurley of less than about 300, a mean flow pore diameter of at least about 0.01 microns, and an Aquapore size of at least about 0.04 microns.

The above battery separator, wherein said at least one layer of porous polymer film further having a thickness of at least about 8 microns, a transverse direction tensile strength of at least about 300 kgf/cm2, a standard deviation of mean flow pore diameter of less than about 0.025.

The above battery separator, wherein said at least one layer of porous polymer film further having a transverse direction shrinkage of less than about 2% at 90° C.

The above battery, wherein said at least one layer of porous polymer film further having a machine direction shrinkage of less than about 6% at 90° C.

The above battery separator, wherein said nonporous precursor is formed by at least one of single layer extrusion and multilayer extrusion.

The above battery separator, wherein said nonporous precursor is a multilayer precursor formed by at least one of coextrusion and lamination.

The above battery separator, wherein said separator is made up of a plurality of said porous polymer films.

The above battery separator, wherein said polymer being selected from the group consisting of polyolefins, fluorocarbons, polyamides, polyesters, polyacetals (or polyoxymethylenes), polysulfides, polyphenyl sulfide, polyvinyl alcohols, co-polymers thereof, blends thereof, and combinations thereof.

The above battery separator, wherein said substantially round shaped pores have at least one of an aspect ratio in the range of about 0.75 to 1.25 and a sphericity factor in the range of about 0.25 to 8.0.

A porous membrane comprising:

at least one layer of porous polymer film made by a dry-stretch process including the steps of:

extruding a polymer into at least a single layer nonporous precursor, and biaxially stretching the nonporous precursor, the biaxial stretching including a machine direction stretching and a transverse direction stretching, the transverse direction stretching including a simultaneous controlled machine direction relax, and having substantially round shaped pores, a porosity of at least about 40%, a ratio of machine direction tensile strength to transverse direction tensile strength in the range of about 0.5 to 5.0, a Gurley of less than about 300, a mean flow pore diameter of at least about 0.01 microns, and an Aquapore size of at least about 0.04 microns.

At least one of a battery separator, a filtration membrane, a humidity control membrane, a gas and/or liquid separation membrane, a selective passage of humidity and blockage of liquid water membrane, and a multi-layered membrane structure comprising the above membrane.

In a device requiring humidity control, the improvement comprising the above membrane.

In a filtration device, the improvement comprising the above membrane.

In a temperature affecting device, the improvement comprising the above membrane.

A method of making a microporous membrane comprising the steps of:

extruding a polymer into a nonporous precursor, and biaxially stretching the nonporous precursor, the biaxial stretching including a machine direction stretching and a transverse direction stretching, the transverse direction including a simultaneous controlled machine direction relax.

The above method, wherein the polymer excludes any oils for subsequent removal to form pores or any pore-forming materials to facilitate pore formation.

The above method, wherein the polymer being a semi-crystalline polymer.

The above method, wherein the polymer being selected from the group consisting of polyolefins, fluorocarbons, polyamides, polyesters, polyacetals (or polyoxymethylenes), polysulfides, polyvinyl alcohols, co-polymers thereof, and combinations thereof.

The above method, further comprising the step of:

annealing the non-porous precursor after extruding and before biaxially stretching.

The above method, wherein annealing being conducted at a temperature in the range of $T_m$−80° C. to $T_m$−10° C.

The above method, wherein biaxially stretching comprising the steps of:

machine direction stretching, and thereafter transverse direction stretching including a simultaneous machine direction relax.

The above method, wherein machine direction stretching being conducted either hot or cold or both.

The above method, wherein cold machine direction stretching being conducted at a temperature $<T_m$−50° C.

The above method, wherein hot machine direction stretching being conducted at a temperature $<T_m$−10° C.

The above method, wherein the total machine direction stretch being in the range of 50-500%.

The above method, wherein the total transverse direction stretch being in the range of 100-1200%.

The above method, wherein the machine direction relax being in the range of 5-80%.

A membrane comprising:

a microporous polymer film made by a dry-stretch process and having substantially round shaped pore and a ratio of machine direction tensile strength to transverse direction tensile strength in the range of 0.5 to 6.0.

The above membrane, wherein an average pore size of said microporous polymer film being in the range of 0.03 to 0.30 microns.

The above membrane, wherein said microporous polymer film having a porosity in the range of 20-80%.

The above membrane, wherein said substantially round shaped pores having at least one of an aspect ratio in the range of about 0.75 to 1.25 and a sphericity factor in the range of about 0.25 to 8.0.

The above membrane, wherein said transverse tensile strength being ≥250 Kg/cm$^2$.

A battery separator comprising the above membrane.

A multi-layered membrane structure comprising the above membrane.

An air-filter cartridge comprising the above membrane.

In a method of filtering particulates from a gas, the improvement comprising the above membrane.

A gas filtration media comprising the above membrane.

A battery separator comprising: a nonwoven flat sheet having a high temperature melt integrity; and the above membrane.

A battery made with the above separator.

In a porous membrane, the improvement comprising at least one of: pore shapes other than slits, round shaped pores, pores like those shown in one of FIGS. 6-8 and 13-54, pores like those shown in one of FIGS. 13-50, pores like those shown in one of FIGS. 6-8 and 13-50, the properties shown in one of Tables I, II or III, increased transverse direction tensile strength, a balance of MD and TD physical properties, high performance related to moisture transport and hydrohead pressure, reduced Gurley, high porosity with balanced physical properties, uniformity of pore structure including pore size and pore size distribution, enhanced durability, composites of such membranes with other porous materials, composites or laminates of such membranes, films or layers with porous nonwovens, coated membranes, coextruded membranes, laminated membranes, membranes having desired moisture transport or moisture vapor transport, hydrohead performance, and physical strength properties, usefulness in more physically abusive environments without loss of desirable membrane features, a combination of membrane moisture transport performance combined with the macro physical properties, being hydrophobic, highly permeable, chemically and mechanically stable, having high tensile strength, and combinations thereof.

At least a selected microporous membrane is made by a dry-stretch process and has substantially round shaped pores and a ratio of machine direction tensile strength to transverse direction tensile strength in the range of 0.5 to 6.0. The method of making the foregoing microporous membrane may include the steps of: extruding a polymer into a nonporous precursor, and biaxially stretching the nonporous precursor, the biaxial stretching including a machine direction stretching and a transverse direction stretching, the transverse direction including a simultaneous controlled machine direction relax. At least selected embodiments of the invention may be directed to biaxially oriented porous membranes, composites including biaxially oriented porous membranes, biaxially oriented microporous membranes, biaxially oriented macroporous membranes, battery separators, filtration media, humidity control media, flat sheet membranes, liquid retention media, and the like, related methods, methods of manufacture, methods of use, and the like.

The present invention may be embodied in other forms without departing from the spirit and the essential attributes thereof, and, accordingly, reference should be made to the appended claims, rather than to the foregoing specification, as indicated the scope of the invention. Further, all numerical ranges set forth herein should be considered as approximate ranges and not necessarily as absolute ranges.

We claim:

1. A method of permitting selective passage of moisture vapor and blockage of liquid water in an HVAC system comprising the steps of:

providing a porous beta-nucleated HEPA/ULPA membrane comprising at least two polypropylene layers and two polyethylene layers bonded together, and further comprising at least one nonwoven layer; the membrane having pores with a three dimensional sphericity factor from 1.0 to 2.0, a porosity of about greater than 60% to 90%, a ratio of machine direction tensile strength to transverse direction tensile strength in the range of about 0.5 to 5.0, a JIS Gurley air permeability less than about 5 seconds/100 cc, a mean flow pore diameter of at least about 0.04 microns, an Aquapore size of at least about 0.07 microns, and a hydro-head pressure greater than about 140 psi, and facilitating passage of the moisture vapor through the membrane in the HVAC system.

2. The method of claim 1 wherein the beta-nucleated polypropylene film is made by a dry-stretch process including the steps of:

extruding the two polypropylene layers into a multi-layer nonporous precursor, and biaxially stretching the nonporous precursor, the biaxial stretching including a machine direction stretching and a transverse direction stretching, the transverse direction stretching including a simultaneous controlled machine direction relax.

3. The method according to claim 2 wherein the biaxially stretching includes the machine direction stretching followed by the transverse direction stretching with simultaneous machine direction relax.

4. The method according to claim 3 wherein the machine direction stretching including one or more machine direction stretching steps.

5. The method according to claim 3 wherein the transverse direction stretching including one or more transverse direction stretching steps.

6. The method of claim 1 wherein the porous membrane having a thickness of at least about 8 microns, a transverse direction tensile strength of at least about 300 kgf/cm$^2$, a standard deviation of mean flow pore diameter of less than about 0.025, a water intrusion pressure of at least about 80 psi, and a WVTR of at least about 8,000 g/m$^2$-day.

7. The method of claim 1 wherein the porous membrane having a transverse direction shrinkage of less than about 1.0% at 90° C.

8. The method of claim 1 wherein the porous membrane having a transverse direction shrinkage of less than about 1.5% at 105° C.

9. The method of claim 1 wherein the porous membrane having a transverse direction shrinkage of less than about 3.0% at 120° C.

10. The method of claim 1 wherein the porous membrane having a thickness in a range of about 8 microns to 80 microns.

11. The method of claim 1 wherein the porous membrane comprises one of a blown film or a slot die film.

12. The method of claim 1 with said porous membrane further having a porosity of about 75 to 90%, a ratio of machine direction tensile strength to transverse direction tensile strength in the range of about 1.0 to 5.0, a mean flow pore diameter of at least about 0.05 microns, an Aquapore size of at least about 0.08 microns, and a hydro-head pressure greater than about 145 psi.

13. The method of claim 1 with said porous membrane further having a ratio of machine direction tensile strength to transverse direction tensile strength in the range of about 0.5 to 5.0, a mean flow pore diameter in a range of about 0.04 to 0.250 microns, a bubble point diameter in the range of about 0.049 to 0.1078 microns, a hydro-head pressure greater than about 140 psi, a water intrusion pressure of at least about 80 psi, and a water vapor transmission rate (WVTR) of ≥8000 g/m$^2$-day.

14. The method of claim 1, wherein the pores have an aspect ratio of length (machine direction) to width (transverse direction) in the range of from 0.75 to 1.25.

15. A method of permitting selective passage of moisture vapor and blockage of liquid water in an HVAC system comprising the steps of:

providing a membrane comprising at least one layer of porous polymer film made by a dry-stretch process, and a nonwoven, wherein said membrane has substantially round shaped pores, a porosity of about 40% to 90%, a ratio of machine direction tensile strength to transverse direction tensile strength in the range of about 0.5 to 5.0, a Gurley of less than about 100, a mean flow pore diameter of at least about 0.04 microns, an Aquapore size of at least about 0.07 microns, and a hydro-head pressure greater than about 140 psi; and facilitating passage of the moisture vapor through the membrane in the HVAC system.

* * * * *